(12) United States Patent
Saito

(10) Patent No.: US 6,408,390 B1
(45) Date of Patent: *Jun. 18, 2002

(54) APPARATUS FOR DATA COPYRIGHT MANAGEMENT SYSTEM

(75) Inventor: Makoto Saito, Tama (JP)

(73) Assignee: Mitsubishi Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/375,000

(22) Filed: Aug. 16, 1999

Related U.S. Application Data

(60) Continuation of application No. 08/781,679, filed on Jul. 24, 1998, now abandoned, which is a division of application No. 08/549,270, filed on Oct. 27, 1995, now abandoned.

(30) Foreign Application Priority Data

Oct. 27, 1994 (JP) .............................................. 6-264200
Dec. 2, 1994 (JP) .............................................. 6-299835

(51) Int. Cl.$^7$ .............................................. G06F 11/30
(52) U.S. Cl. ........................ 713/193; 713/168; 713/171; 713/189; 713/200; 380/277; 380/282; 380/286
(58) Field of Search .............................. 705/51, 53, 57; 380/201, 277, 282, 286; 713/168, 171, 189, 193–200

(56) References Cited

U.S. PATENT DOCUMENTS

| | | | |
|---|---|---|---|
| 4,352,952 A | 10/1982 | Boone et al. | |
| 4,919,545 A | 4/1990 | Yu | 380/25 |
| 5,173,939 A | 12/1992 | Abadi et al. | 380/25 |
| 5,220,604 A | * 6/1993 | Gasser et al. | 380/23 |
| 5,224,163 A | * 6/1993 | Gasser et al. | 380/30 |
| 5,315,657 A | 5/1994 | Abadi et al. | 380/25 |

(List continued on next page.)

FOREIGN PATENT DOCUMENTS

| | | |
|---|---|---|
| EP | 0121853 | 10/1984 |
| EP | 0430734 | 6/1991 |
| WO | 9002382 | 3/1990 |

OTHER PUBLICATIONS

Wayner, Digital Copyright Protection, AP Professional, 1997.*

Hiroshi Morizaki, "Introduction to Electronic Devices," Gijutsu Hyoron Publishing Co., pp. 260–266 (1989) (English language translation of underlined portions only).

Ryuichi Adachi, "Introduction to Handcraft of Personal Computer," Natsume Publishing Co., pp. 141–155 (1983) (English language translation of underlined portions only).

Fujio Masuoka, "Progressing Flash Memories," Kogyo Chosakai Co., pp. 34–68 (1992) (English translation of underlined portions only).

Primary Examiner—Thomas R. Peeso
(74) Attorney, Agent, or Firm—Armstrong, Westerman & Hattori, LLP

(57) ABSTRACT

A data copyright management apparatus for handling data copyrights, and data of digital cash and video conference system is provided. The data copyright management apparatus comprises a CPU, ROM, EEPROM, and RAM. The ROM, EEPROM, and RAM are connected to the CPU bus, and a system bus of a device which utilizes the data can be connected to the CPU bus. A data copyright management system program, crypt algorithm, and user information are stored in the ROM, and a first public-key, a first private-key, a second public-key, a second private-key, a first secret-key, a second secret-key, a copyright information are stored in the EEPROM. The data copyright management apparatus may be configured in the form of a monolithic or hybrid IC, a thin IC card, PC card, insertion board, and further, may be incorporated in a computer, television set, set-top box, digital video tape recorder, digital video disk recorder, digital audio tape apparatus, or personal digital assistants, and the like.

5 Claims, 14 Drawing Sheets

U.S. PATENT DOCUMENTS

| | | | |
|---|---|---|---|
| 5,319,705 A | * 6/1994 | Halter et al. | 380/4 |
| 5,347,581 A | 9/1994 | Naccache et al. | 380/30 |
| 5,353,351 A | 10/1994 | Bartoli et al. | 380/33 |
| 5,381,480 A | 1/1995 | Butter et al. | 380/37 |
| 5,400,403 A | * 3/1995 | Fahn et al. | 380/21 |
| 5,414,772 A | 5/1995 | Naccache et al. | 380/30 |
| 5,438,508 A | 8/1995 | Wyman | 364/401 |
| 5,457,746 A | * 10/1995 | Dolphin | 380/4 |
| 5,465,299 A | * 11/1995 | Matsumoto et al. | 380/23 |
| 5,475,757 A | 12/1995 | Kelly | 380/24 |
| 5,479,514 A | 12/1995 | Klonowski | 380/47 |
| 5,504,816 A | 4/1996 | Hamilton et al. | 380/20 |
| 5,504,817 A | 4/1996 | Shamir | 380/30 |
| 5,504,818 A | * 4/1996 | Okano | 380/49 |
| 5,515,441 A | 5/1996 | Faucher | 380/30 |
| 5,577,121 A | 11/1996 | Davis et al. | 380/24 |
| 5,584,023 A | 12/1996 | Hsu | 395/620 |
| 5,633,934 A | * 5/1997 | Hember | 380/50 |
| 5,666,411 A | * 9/1997 | McCarty | 380/4 |
| 5,832,083 A | * 11/1998 | Iwayama et al. | 380/4 |

* cited by examiner

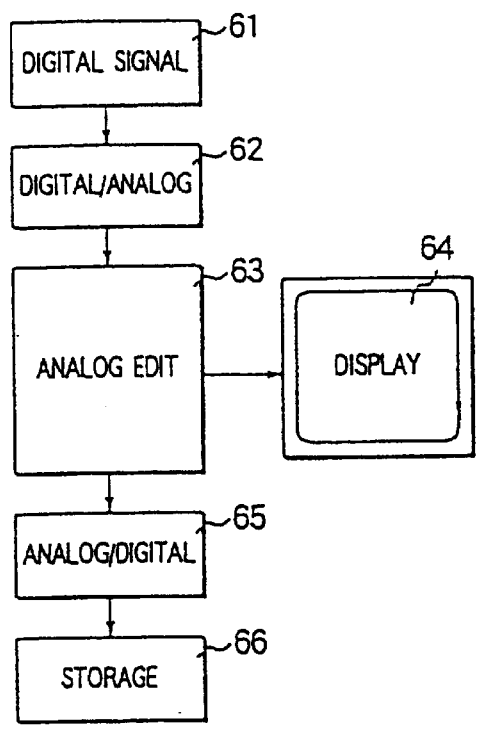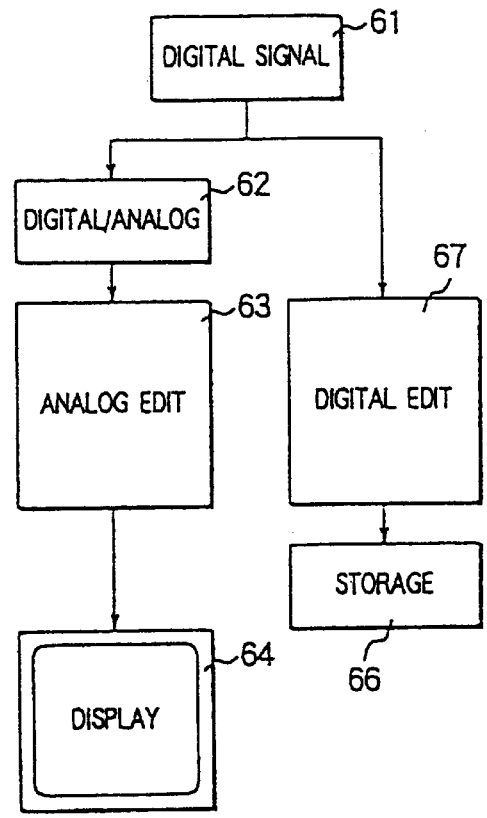
FIG. 7(a) (PRIOR ART)
FIG. 7(b) (PRIOR ART)

APPARATUS FOR DATA COPYRIGHT MANAGEMENT SYSTEM

This application is a continuation of prior application Ser. No. 08/781,679 filed Jul. 24, 1998, now abandonded, which is a divisional application of prior application Ser. No. 08/549,270 filed Oct. 27, 1995 now abandonded. The entire disclosure of prior application Ser. No. 08/549,270 is considered a part of the disclosure of the present application and is hereby incorporated by reference herein.

BACKGROUND OF THE INVENTION

1. Field of the Invention

The present invention relates to an apparatus for displaying, storing, copying, editing or transferring digital data, and protecting digital data copyrights.

2. Background Art

In the information-oriented society of today, database systems are becoming wide spread in which it is possible to use various types of data which were stored independently in each computer in the past, by connecting computers via communication lines.

In such a database system, the information handled up to this point has been conventionally coded information that can be processed by a computer, and that contains a relatively small amount of information and monochrome binary data, such as facsimile information at most. It has not been possible to handle data containing a relatively large amount of information, such as data for natural pictures or animation.

With the rapid progress of digital processing technique for various electric signals, a technique is under development for digital processing of picture signals other than binary data, which had been handled only as analog signals in the past.

By digitizing the picture signal, it is possible to handle a picture signal, e.g., a television signal, by a computer. The technology of a "multimedia system" is an emerging technology of the future capable of simultaneously handling the data handled by computers and digitized picture data.

Because picture data contains an overwhelmingly large amount of information compared with character data and audio data, it is difficult to store or transfer or process the picture data by computer. For this reason, techniques for compressing or expanding picture data have been developed. Further, several standards for compression/expansion of picture data have been established. For example, the following standards have been established as common standards: JPEG (Joint Photographic image coding Experts Group) standards for still pictures, H.261 standards for video conferences, MPEG1 (Moving Picture image coding Experts Group 1) standards for picture accumulation, and MPEG2 standards for current television broadcasting and high definition television broadcasting. By using these new techniques, it is now possible to transmit digital picture data in real time.

For analog data, which has been widely used in the past, the control of copyrights during processing has not been an important issue because the quality of the analog data deteriorates each time the data is stored, copied, edited, or transferred. The editing of a copyrighted work produced according to the above operation has not been a large problem. However, the quality of digital data does not deteriorate when the data is repeatedly stored, copied, edited, or transferred. Therefore, the management and control of copyrights during processing of digital data is an important issue.

Up to now, there has been no adequate method for management and control of copyrights for digital data. They have been managed and controlled merely by copyright law or by contracts. In copyright law, only compensation for digital sound or picture recording devices has been prescribed.

It is possible not only to refer to the content of a database, but also to effectively utilize the data obtained from the database by storing, copying, or editing the data, and also transferring the edited data to the database with the edited data registered as new data. Further, it is possible to transfer edited data to other persons via a communication link or by a proper recording medium.

In a conventional database system, only character data is handled. However, in multimedia systems, sound data and picture data originally generated as analog data, are digitized and used as part of the database in addition to the other data in the database such as character data.

Under such circumstances, it is an important question to determine how to handle copyrights of the data in the database. However, there are no means in the prior art for copyright management and control of such actions as copying, editing, transferring, etc. of data.

Although data from "software with advertisement" or "free software" is generally available free of charge, it is copyrighted and its use may be restricted by the copyright depending on the way it is used.

The inventors of the present invention proposed a system for copyright management, wherein a permit key is obtained from a key control center via a public telephone line in Japanese Patent Laid-Open No. 46419/1994 and Japanese Patent Laid-Open No. 141004/1994. Japanese Patent Laid-Open No. 32916/1994 by the same inventors also discusses an apparatus for copyright management. Furthermore, the same inventors proposed a system for managing a copyright of digital data in Japanese Patent Application No. 64889/1994 (U.S. patent application Ser. No. 08/416,037) and Japanese Patent Application No. 237673/1994 (U.S. Pat. No. 6,069,952).

In these systems and apparatus, one who wants to view and listen to encrypted programs requests viewing from a control center via a communications line by using a communication device. The, control center sends a permit key to the requester, performs charging and collects a fee.

After receiving the permit key, the requester sends the permit key to a receiver by using an on-line or off-line means. The receiver then decrypts the encrypted programs using the permit key.

The system disclosed in Japanese Patent Application No. 64889/1994 (U.S. patent application Ser. No. 08/416,037) uses a program and copyright information for managing the copyright, in addition to the permit key, so that the copyright for display (including sound processes), storage, copying, editing, or transferring of the digital data in the database system, including real-time transmission of a digital picture, can be managed. The program for managing the copyright watches and manages to prevent a user from using the digital data outside the conditions of the user's request or permission.

Japanese Patent Application No. 64889/1994 (U.S. patent application Ser. No. 08/416,037) further discloses that data is supplied in encrypted form from a database, decrypted by a copyright management program when displayed or edited, and encrypted again when it is stored, copied or transferred. Also, the copyright management program, being encrypted, is decrypted by a permit key. The copyright management program thus decrypted performs encryption and decryption of copyright data, and when data is utilized other than for storage and display, copyright information including information about the user, being stored as a history in addition to the original copyright information, is disclosed.

A general description of cryptography is provided below. Cryptography includes a secret-key cryptosystem and a public-key cryptosystem.

The secret-key cryptosystem is a cryptosystem using the same crypt key for encryption and decryption. While this cryptosystem requires only a short time for encryption or decryption, if the secret-key is found, the cryptogram may be cryptanalyzed.

The public-key cryptosystem is a cryptosystem in which a key for encryption is open to the public as a public-key, and a key for decryption is not open to the public. The key for encryption is referred to as a public-key and the key for decryption is referred to as a private-key. To use this cryptosystem, it is necessary that the party transmitting information encrypts the information with the public-key of the party receiving the information. The party receiving the information decrypts the information with a private-key not open to the public. While this cryptosystem requires a relatively long time for encryption or decryption, the private-key cannot easily be found, and it is very difficult to cryptanalyze the cryptogram.

In cryptography, a case of encrypting a plaintext M with a crypt key K to obtain a cryptogram C is expressed as

C=E(K, M)

and a case of decrypting the cryptogram C with the crypt key K to obtain the plaintext M is expressed as

M=D(K, C).

The cryptosystem used for the present invention uses a secret-key cryptosystem in which the same secret-key Ks is used for encryption and decryption, and a public-key cryptosystem in which a public-key Kb is used for encryption of plaintext data and a private-key Kv is used for decryption of a cryptogram.

FIG. 1 shows a structure of the data copyright management system disclosed in the Japanese Patent Application No. 237673/1994, (U.S. Pat. No. 6,069,952) in which the apparatus for data copyright management system of the present invention can be used.

In this system, encrypted data is supplied via two-way communication in accordance with a request from the primary user 4.

This system uses the secret-key cryptosystem and the public-key cryptosystem as a cryptosystem.

It will be obvious that this system can be applied when using a satellite broadcast, ground wave broadcast, CATV broadcast or a recording medium other than a database as the data supply means provided with advertisement requiring no charge or encryption.

In this system, reference numeral 1 represents a database, 4 represents a primary user terminal, 5 represents a secondary user terminal, 6 represents a tertiary user terminal, and 7 represents an n-order user terminal. Also, reference numeral 3 represents a copyright management center, 8–10 represent a secondary copyright data, tertiary copyright data, and n-order copyright data, respectively, stored at the copyright management center 3. Reference numeral 2 represents a communication network such as a public telephone line offered by a communication enterprise or a CATV line offered by a cable television enterprise.

In the above arrangement, the database 1, primary user terminal 4, secondary user terminal 5, tertiary user terminal 6, n-order user terminal 7, and copyright management center 3 are connected to the communication network 2. They can also be connected each other.

In FIG. 1, a path shown by a broken, line represents a path for encrypted data. A path shown by a solid line represents a path of requests from each user terminal. A path shown by a one-dot chain line represents a path through which a crypt key and authorization information corresponding to a utilization request for data are transferred. A path shown by a two-dot chain line represents a path through which copyright-information is transferred from the database or from one data element to a next-order data element within the copyright management center.

Each user who uses this system has previously been entered in the database system and has been provided with database utilization software (i.e., a data copyright management system program). The database utilization software includes a program for decrypting an encrypted copyright management program in addition to normal communication software such as data communications protocols.

To use the database 1, a primary user prepares primary-user authentication data Au1, a first public-key Kb1, a first private-key Kv1 corresponding to the first public-key Kb1, a second public-key Kb2, and a second private-key Kv2 corresponding to the second public-key Kb2. The primary user accesses the database 1 from the primary user terminal 4 via the communication network 2.

The database 1, receiving the primary-user authentication data Au1, first public-key Kb1 and second public-key Kb2 from the primary user, confirms the primary-user authentication data Au1 and transfers the confirmed primary-user authentication data Au1 to the copyright management center 3 as the primary user information Iu1.

The database 1 prepares two secret-keys, first secret-key Ks1 and second secret-key Ks2. The second secret-key Ks2 is transferred to the copyright management center 3.

As the result of the above transfer, a permit key corresponding to primary utilization, the primary user information Iu1, original copyright information Ic0 and the second secret-key Ks2 are stored in the copyright management center 3. In this case, the original copyright information Ic0 is used for copyright royalties distribution.

When a primary user who desires data utilization accesses the database 1 from the primary user terminal 4, a data menu is transferred to him. In this case, information for charges may be displayed together with the data menu.

When the data menu is transferred, the primary user retrieves the data menu and selects the data M. In this case, the original copyright information Ic0 of the selected data M is transmitted to the copyright management center 3. The primary user selects permit key Kp1 corresponding to the required form of the usage such as viewing, storing, copying, editing and transferring of data. Permit key Kp1 is also transmitted to the copyright management center 3.

Because viewing and storing of data are the minimum required forms of use for the primary user, these forms of use may be excluded from the choices, thus offering only copying, editing and transferring as choices.

The original data M0 is read out of the database 1 in accordance with a request of the primary user. The read original data M0 is encrypted by the first secret-key Ks1:

Cm0ks1=E(Ks1, M0).

The encrypted data Cm0ks1 is provided with the unencrypted original copyright information Ic0.

The first secret-key Ks1 is encrypted by the first public-key Kb1 and the second secret-key Ks2 is encrypted by the second public-key Kb2:

Cks1kb1=E(Kb1, Ks1)

Cks2kb2=E(Kb2, Ks2).

While the copyright management program P is also encrypted by the second secret-key Ks2:

Cpks2=E(Ks2, P), the copyright management program P may not always be encrypted by the second secret-key Ks2 but it may be encrypted by any other proper crypt key.

The encrypted original data Cm0ks1, encrypted copyright management program Cpks2, and two encrypted secret-keys Cks1kb1 and Cks2kb2 are transferred to the primary user terminal 4 via the communication network 2 and charged, if necessary.

It is possible to store the encrypted copyright management program Cpks2 in means such as in a ROM in the user terminal 4 instead of supplying it from the database 1.

The primary user receiving the encrypted original data Cm0ks1, two encrypted secret-keys Cks1kb1 and Cks2kb2, and encrypted copyright management program Cpks2 from the database 1 decrypts the encrypted first secret-key Cks1kb1 with the database utilization software (i.e., the data copyright management system program) using the first private-key Kv1 corresponding to the first public-key Kb1:

Ks1=D(Kv1, Cks1kb1), and decrypts the encrypted second secret-key Cks2kb2 using the second private-key Kv2 corresponding to the second public-key Kb2:

Ks2=D(Kv2, Cks2kb2).

The primary user decrypts the encrypted copyright management program Cpks2 using the decrypted second secret-key Ks2:

P=D(Ks2, Cpks2).

Finally, the primary user decrypts the encrypted data Cm0ks1 by the decrypted copyright management program P using the decrypted first secret-key Ks1:

M0=D(Ks1, Cm0ks1)

and uses the decrypted original data M0 directly or data M1 as edited.

As described above, the first private-key Kv1 and second private-key Kv2 are crypt keys prepared by the primary user but not open to others. Therefore, even if a third party obtains the data M, it is impossible to use the encrypted data M by decrypting it.

Thereafter, to store, copy, or transfer the data M as the original data M0 or the edited data M1, it is encrypted and decrypted using the second secret-key Ks2:

Cmks2=E(Ks2, M)

M=D(Ks2, Cmks2).

The decrypted second secret-key Ks2 is thereafter used as a crypt key for encrypting/decrypting data when storing, copying, or transferring the data.

The first private-key Kv1 and second private-key Kv2, the first secret-key Ks1 and second secret-key Ks2, the data M, the copyright management program P, the original copyright information Ic0 and copyright information Ic1, containing information about the primary user and the editing date and time, are stored in the primary user terminal 4.

Further protection is provided by attaching the copyright information Ic1 to the data as copyright information label, and adding the digital signature.

The encrypted data Cmks2 is encrypted to be distributed. Since the copyright information label provides a clue to obtain the second secret-key Ks2 which is the key for decryption, the second secret key Ks2 cannot be obtained in the case where the copyright information label is removed from the encrypted data Cmks2.

When the encrypted data Cmks2 is stored in the primary user terminal 4, the second secret-key Ks2 is stored in the terminal 4. However, when the encrypted data Cmks2 is not stored in the primary user terminal 4 but is copied to the recording medium 11 or transferred to the secondary user terminal 5 via the communication network 2, the second secret-key Ks2 is disused in order to disable subsequent utilization of the data in the primary user terminal 4.

In this case, it is possible to set a limitation for repetitions of copying or transferring of the data so that the second secret-key Ks2 is not disused within limited repetitions of copying and transferring of the data.

The primary user who is going to copy the data M to the external recording medium 11 or transmit the data M via the communication network 2 must prepare the second secret-key Ks2 to encrypt the data M by this second secret-key Ks2 before copying or transmitting the data:

Cmks2=E(Ks2, M).

The unencrypted original copyright information Ic0 and primary-user copyright information Ic1 are added to the encrypted data Cmks2.

Before using a database, a secondary user, similar to the primary user, prepares authentication data Au2 for authenticating the secondary user, a third public-key Kb3, a third private-key Kv3 corresponding to the third public-key Kb3, a fourth public-key Kb4, and a fourth private-key Kv4 corresponding to the fourth public-key Kb4.

The secondary user who desires secondary utilization of the copied or transferred encrypted data Cmks2 must designate the original data name or number to the copyright management center 3 in order to request secondary utilization from the secondary user terminal 5 via the communication network 2. In this time, the secondary user also transfers the third public-key Kb3 and the fourth public-key Kb4, as well as the secondary user authentication data Au2, original copyright information Ic0 and primary user copyright information Ic1.

The copyright management center 3 receiving the secondary utilization request from the secondary user confirms the secondary-user authentication data Au2, and transfers confirmed secondary-user authentication data Au2 to the tertiary copyright data 9 as secondary user information.

When the secondary copyright information Ic1 of the primary user is transferred, the secondary copyright information Ic1 is provided to the secondary copyright data 8, and then, secondary copyright data 8 recognizes the secondary copyright information Ic1 to be transferred to the tertiary copyright data 9.

The secondary user selects permit key Kp2 corresponding to the form of data usage such as viewing, storing, copying, editing and transferring of data. Permit key Kp2 corresponding to the selected usage is sent to the tertiary copyright data 9.

Because viewing and storing of data are the minimum required forms of use for the secondary user, these forms of use may be excluded from the choices, offering only copying, editing and transferring as the choices.

The secondary copyright data 8 prepares a third secret-key Ks3. The prepared third secret-key Ks3 is transferred to and stored in the tertiary copyright data 9.

As the result of the above transfer, the permit key Kp2, primary user copyright information Ic1, primary user information Iu1, original copyright information Ic0, secondary user information Iu2, and third secret-key Ks3 are stored in the tertiary copyright data 9. The permit key Kp2, primary user copyright information Ic1, and primary user information Iu1 are used for copyright royalties distribution.

Hereafter similarly, permit key Kpn corresponding to n-order usage, copyright information for secondary exploitation right Icn-1 of (n-1)-order user, primary user information Iu1, original copyright information Ic0, n-order user information Iun, and n-th secret-key Ksn are stored in n-order copyright data 10.

The permit key Kp2, primary user information Iu1, original copyright information Ic0 and second secret-key Ks2 are read out of the secondary copyright data 8. The original copyright information Ic0 is used for copyright royalties distribution.

The read second secret-key Ks2 and third secret-key Ks3 are encrypted by the third public-key Kb3 and fourth public-key Kb4 of the secondary user respectively:

Cks2kb3=E(Kb3, Ks2)

Cks3kb4=E(Kb4, Ks3).

The copyright management program P is encrypted by the third secret-key Ks3:

Cpks3=E(Ks3, P).

The encrypted copyright management program Cpks3, encrypted second secret-key Cks2kb3, and encrypted third secret-key Cks3kb4 are transferred to the secondary user terminal 5 via the communication network 2. In this case, charging is performed, if necessary.

The secondary user, receiving two encrypted secret-keys, Cks2kb3 and Cks3kb4, and the encrypted copyright management program Cpks3 from the secondary copyright data 8, and using the database utilization software (i.e., the data copyright management system program) decrypts the encrypted second secret-key Cks2kb3 by the third private-key Kv3, and decrypts the encrypted third secret-key Cks3kb4 by the fourth private-key Kv4 corresponding to the fourth public-key Kb4:

Ks2=D(Kv3, Cks2kb3)

Ks3=D(Kv4, Cks3kb4).

The encrypted copyright management program Cpks3 is decrypted by the decrypted third secret-key Ks3:

P=D(Ks3, Cpks3).

Then, the encrypted data Cmks2 is decrypted for use by the decrypted second secret-key Ks2 using decrypted copyright management program P:

M=D(Ks2, Cmks2)

As described above, the third private-key Kv3 and the fourth private-key Kv4 are prepared by the secondary user but not opened to others. Therefore, even if a third party obtains the encrypted data Cmks2, it is impossible to use the data by decrypting it.

Each user who uses the above-mentioned system must have previously been entered in the database system, and when entered in the system is provided with database utilization software.

Because the software includes not only normal communication software, such as a data communication protocols but also a program for decrypting a copyright, management program by a first crypt-key, protection is necessary.

A first crypt-key K1, a second crypt-key K2, and a copyright management program P are transferred to each user in order to use data M. Each user keeps these keys and the program.

Further, the copyright information label, the user information, the public-key and private-key in the public-key cryptosystem and the program containing the algorithm for generating the secret-key are stored when needed.

For storing them, the simplest means to use is a flexible disk. However, the flexible disk is easy to lose or alter.

A hard disk drive, is also subject to loss or alteration of data, though it is more stable than the flexible disk.

Recently, use of an IC card has spread in which an IC element is sealed in a card-like package. Particularly, standardization of a PC card with a microprocessor sealed inside has developed for PCMCIA cards and JEIDA cards.

The data copyright management apparatus proposed by the present inventors in the Japanese Patent Application No. 237673/1994 (U.S. Pat. No. 6,069,952) is described in FIG. 2.

The data copyright management unit 15 is configured as a computer system comprising a microprocessor (CPU) 16, a local bus 17 of CPU 16, read only memory (ROM) 18 connected to local bus 17, and write/read memory (RAM) 19, and wherein the local bus 17 is connected to system bus 22 of the microprocessor 21 of the user terminal 20.

Further, a communication unit (COMM) 23 which receives data from an external database and transfers data to the external database; a CD-ROM drive (CDRD) 24 which reads data provided by CD-ROM; a flexible disk drive (FDD) 25 which copies received or edited data to a flexible disk drive to provide the outside with such data, and a hard disc drive (HDD) 26 which stores data are connected to the system bus 22 in the user terminal 20.

As is typical, ROM and RAM or the like are connected to the system bus 22 of the user terminal. However, this is not shown in the figure.

Fixed information, such as software and user data, for utilizing the database is stored in ROM 18 of the data copyright management unit 15. A crypt-key and the copyright management program provided from the key control center or copyright management center are stored in RAM 19.

The process of decryption and re-encryption are performed by the data copyright management unit 15, only the results of which are transferred to the user terminal 20 via the local bus 17 and the system bus 21 of the user terminal.

The data copyright management unit 15 is implemented as monolithic IC, hybrid IC, an expansion board, an IC card, or a PC card.

SUMMARY OF THE INVENTION

In the present application, apparatus for a data copyright management system, resulting from the further implementation of the apparatus used with the user terminal proposed in the Japanese Patent Application No. 237673/1994, (U.S. Pat. No. 6,069,952) is proposed.

The apparatus for data copyright management in the present invention is attached to the user terminal, which comprises a central processing unit, central processing unit bus, read only semiconductor memory, electrically erasable programmable read-only memory, and read/write memory.

The central processing unit, read only semiconductor memory, electrically erasable programmable read-only memory, and read/write memory are connected to the central processing unit bus. Also, the system bus of a unit which utilizes the data can be connected to it. A data copyright management system program (a database utilization software), a crypt algorithm, and user information are stored in the read only semiconductor memory. A second private-key, permit key, second secret-key, and copyright information are stored in the electrically erasable programmable read-only memory. The first public-key, first private-key, second public-key, and first secret-key are transferred to the read/write memory during operation of the unit. If the copyright management program is provided from the outside, it is stored in the EEPROM. Otherwise, it is stored in ROM.

As embodiments of the data copyright management apparatus, a monolithic IC, a hybrid IC, a thin IC card, a PC card, and a board for insertion may be used.

In the data copyright management system described above as a Japanese Patent Application, (i.e., Japanese Patent Application No. 64889/1994: U.S. patent application Ser. No. 08/416,037, and Japanese Patent Application No. 237673/1994: U.S. Pat. No. 6,069,952) while the obtained encrypted data is decrypted for displaying/editing, the obtained or edited data is re-encrypted to store/copy/transfer, so that no unauthorized use of the data is allowed.

Accordingly, in the apparatus used in the data copyright management system of the present invention, re-encryption of data, as well as decryption of data should be performed concurrently. However, the data copyright management apparatus described in the Japanese Patent Application, (i.e., Japanese Patent Application No. 64889/1994: U.S. patent application Ser. No. 08/416,037, and Japanese Patent Application No. 237673/1994: U.S. Pat. No. 6,069,952) can perform only one process of either data decryption or data re-encryption at the same time.

Thus, in the present application, a data copyright management apparatus is proposed which, at the same time, can decrypt and re-encrypt the supplied encrypted data to perform copyright management and control.

For this purpose, data which was encrypted and provided is decrypted and re-encrypted by adding at least one microprocessor, and preferably two microprocessors, in addition to the microprocessor that controls the entire user terminal therein. When one microprocessor is added, one of the two microprocessors which include the microprocessor of the user and the added one, will decrypt data and the other will re-encrypt data.

When two microprocessors are added, one of the added microprocessors will decrypt data, another microprocessor will re-encrypt data, and the third microprocessor of the user terminal will control the entire operation.

Although the added microprocessors may be connected to the system bus of the microprocessor in the user terminal, this configuration may not allow a multiprocessor configuration to operate plural microprocessors concurrently. Therefore, in the present application, a data copyright management apparatus is implemented as a multiprocessor configuration utilizing SCSI bus or PCI bus.

Other than character data, digital data includes graphic data, computer programs, digital audio data, still picture data of the JPEG standard, and motion-picture works of the MPEG standard. While the data applications comprising these data forms are utilized by using various apparatus, it is necessary that these apparatus also include the data copyright management function.

Thus, in the present application, it is proposed that, as a form of use, these data copyright management apparatus and the data copyright management apparatus described in the prior application be incorporated in various systems.

BRIEF DESCRIPTION OF THE DRAWINGS

FIG. 7 is a flow chart of a general editing process for digital data.

DETAILED DESCRIPTION

The detailed embodiments of the present invention are described below with reference to the drawings.

Figure 3:
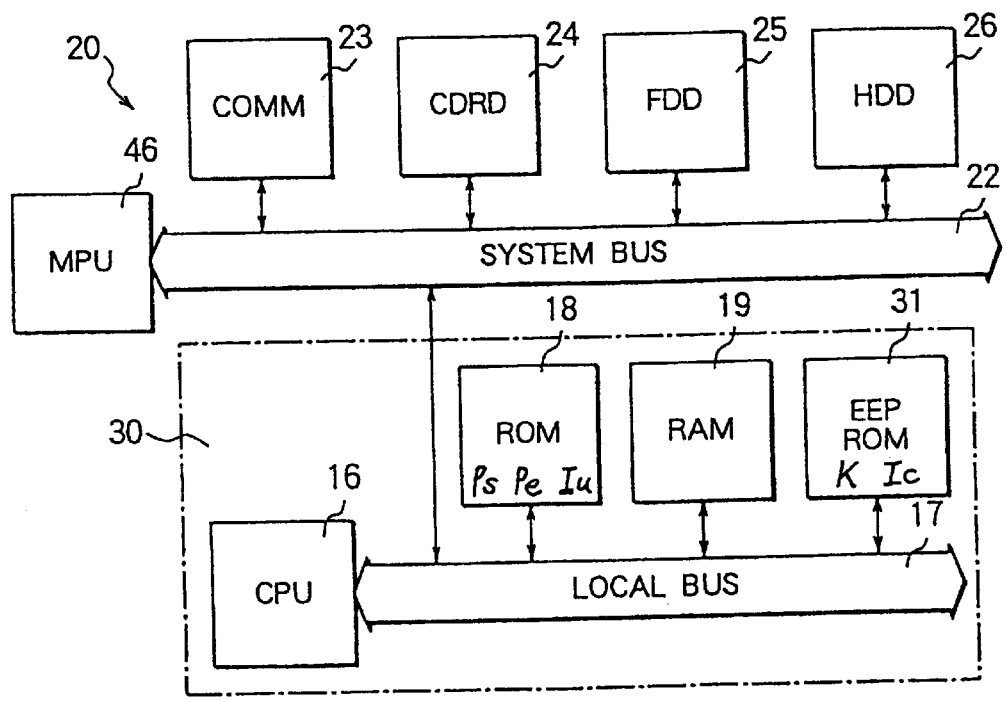
FIG. 3 is a block diagram of the data copyright management apparatus of a first embodiment of the present invention.

A first embodiment of the data copyright management apparatus related to the present invention is shown in the block diagram of FIG. 3.

The data copyright management unit 30 includes electrically erasable programmable read-only memory (EEPROM) 31 in addition to the components of the data copyright management unit 15 described in Japanese Patent Application No. 237673/1994 (U.S. Pat. No. 6,069,952).

The data copyright management unit 30 is a computer system having CPU 16 and local bus 17 of CPU 16, as well as ROM 18, RAM 19, and EEPROM 31 which are, connected to local bus 17, wherein local bus 17 is connected to the system bus 22 of the microprocessor 21 in the user terminal 20.

Further, communication unit (COMM) 23, which receives data from an external database and transfers data outside; CD-ROM drive (CDRD) 24, which reads data provided by CD-ROM; a flexible disc drive (FDD) 25, which copies data received or edited in order to supply it to the outside; and hard disk drive (HDD) 26, which stores data, are connected to the system bus 22 of the user terminal 20.

ROM and RAM are connected to the system bus 22 of the user terminal. However, they are not shown in the figure.

Fixed information such as a data copyright management program P, a cryptography program Pe based on a crypt algorithm, and user data Iu are stored in ROM 18.

A crypt-key K and copyright information Ic are stored in EEPROM 31. Further, when the data copyright management program and cryptography program are supplied from outside, such as from a database, they are stored in EEPROM 31, rather than in ROM 18.

The data copyright management unit 30 performs the process of decryption or re-encryption, only the result of which is transferred to the user terminal 20 via local bus 17 and system bus 22.

The data copyright management unit 30 is implemented as a monolithic IC, a hybrid IC, an expansion board, an IC card, or a PC card.

Fixed data such as a data copyright management program, a cryptography program based on a crypt algorithm, and user data are stored in ROM 18 of the data copyright management unit 30 in the first embodiment.

Further, a decryption program, a re-encryption program, and a program for generating secret-keys based on a known secret-key algorithm may be stored in ROM 18.

A crypt-key and copyright information are stored in EEPROM 31. Also, when the copyright management program and the cryptography program are supplied from the outside, such as from a database, they are stored in EEPROM 31, rather than ROM 18. Still, the EEPROM is not necessarily required and may be omitted.

Either one of the first crypt-key or the second crypt-key supplied from the key control center or copyright management center, and the data copyright management system program are stored in RAM 19. However, information such as software and the user data required by MPU 46 in the user terminal 20 are supplied to the user terminal 20 by the software, and stored in RAM of the user terminal 20. Besides either one of the first crypt-key or the second crypt-key supplied from the key control center or the copyright management center, and the data copyright management system program are stored in RAM of the user terminal unit 20.

The process of decryption and re-encryption are shared by MPU 46 of the main body of the user terminal 20 and CPU 16 of the data copyright management unit 30; one re-encrypts- data and the other decrypts data, and only the processed results of the data copyright management unit 30 are transferred to the user terminal.

Figure 4:
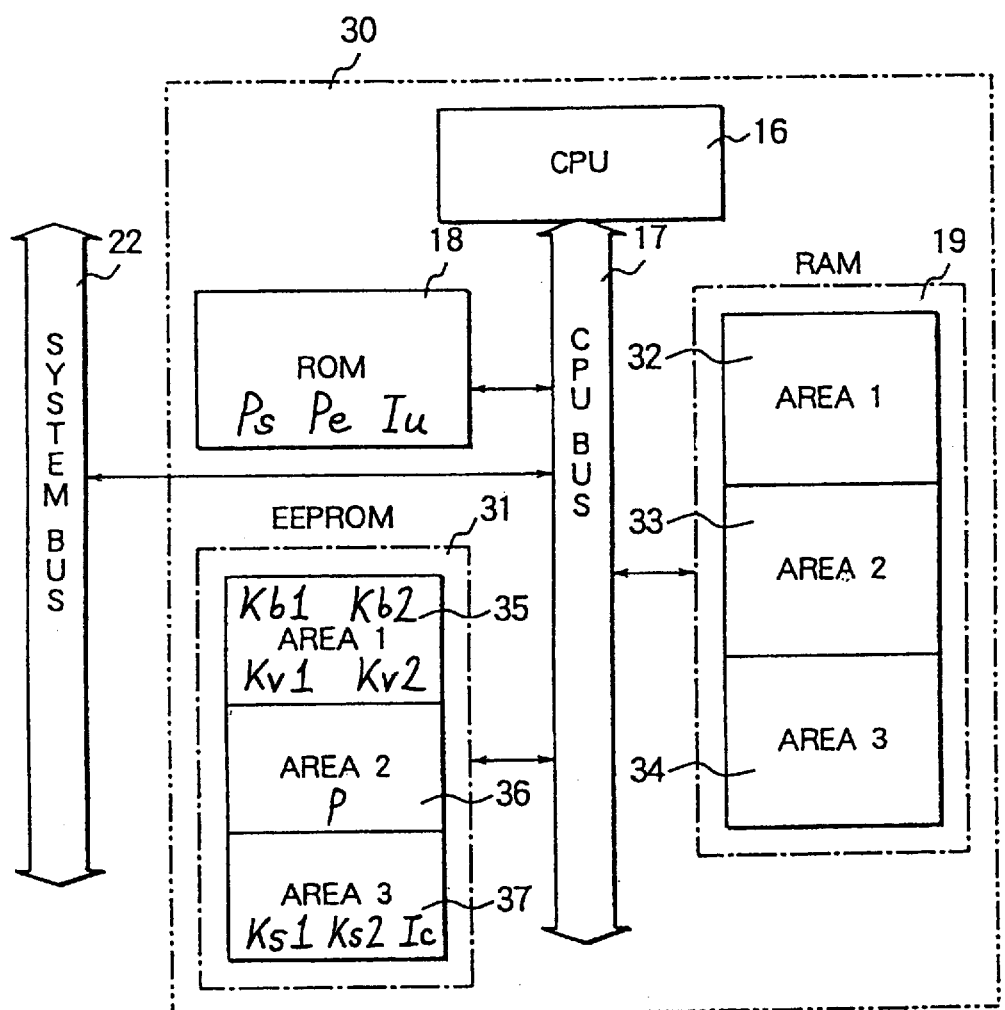
FIG. 4 is a specific block diagram of the data copyright management apparatus of a first embodiment of the present invention.

The specific internal structure of the data copyright management unit 30 in FIG. 3 is shown in FIG. 4.

A microcomputer (CPU) 16, read only semiconductor memory (ROM) 18, write/read memory (RAM) 19, and electrically erasable programmable read-only memory (EEPROM) 31 are enclosed in the data copyright management unit 30, and are connected to microcomputer bus 17 of the microcomputer 16. The microcomputer bus 17 is further connected to system bus 22 of the user terminal 20 main body.

The data copyright management system program, crypt algorithm, and the user information are stored in the read only semiconductor memory 18.

The electrically erasable programmable read-only memory 31 is divided internally into three areas. In the first area 35, the first public-key Kb1, the first private-key Kv1, the second public-key Kb2, and the second private-key Kv2 are stored.

In the second area 36, the copyright management program P, the first secret-key Ks1 for use as a permit key for primary use (for example, as a view permit, store permit, copy permit, edit permit, or transfer permit), and the second secret key Ks2 for use as a permit key for secondary use (for example, as a view permit, store permit, copy permit, edit permit or transfer permit) are stored. However, in some cases where the copyright management program P is not supplied from the outside, but preset in the user side, the copyright management program P is stored in the read only memory 18, rather than in the second area 36 of the electrically erasable programmable read-only memory 31.

In the third area 37, an access control key and copyright information such as the original copyright information and the secondary copyright information are stored.

As in the case of the electrically erasable programmable read-only memory 31, the inside of the write/read memory 19 is divided into three areas. In the first area 32, the first public-key Kb1, the first private-key Kv1, and the second public-key Kb2 are stored during operation. In the second area 33, the first secret-key Ks1 for use as a permit key in the primary utilization (for example, as a view permit, store permit, copy permit, edit permit, or transfer permit) is stored during operation. In the third area 34, an access control key is stored during operation.

The user terminal attached with the data copyright management apparatus is reliable since it performs all of the processes for utilizing data within the data copyright management unit related to the present invention, so that only the results are transferred to the user terminal for various utilization.

When picture data containing large amounts of information is transferred/received, original data is transmitted after being compressed to reduce the amount of data. The compressed data is expanded after reception to utilize it. In this case, the data copyright may be managed by encryption.

Figure 5:
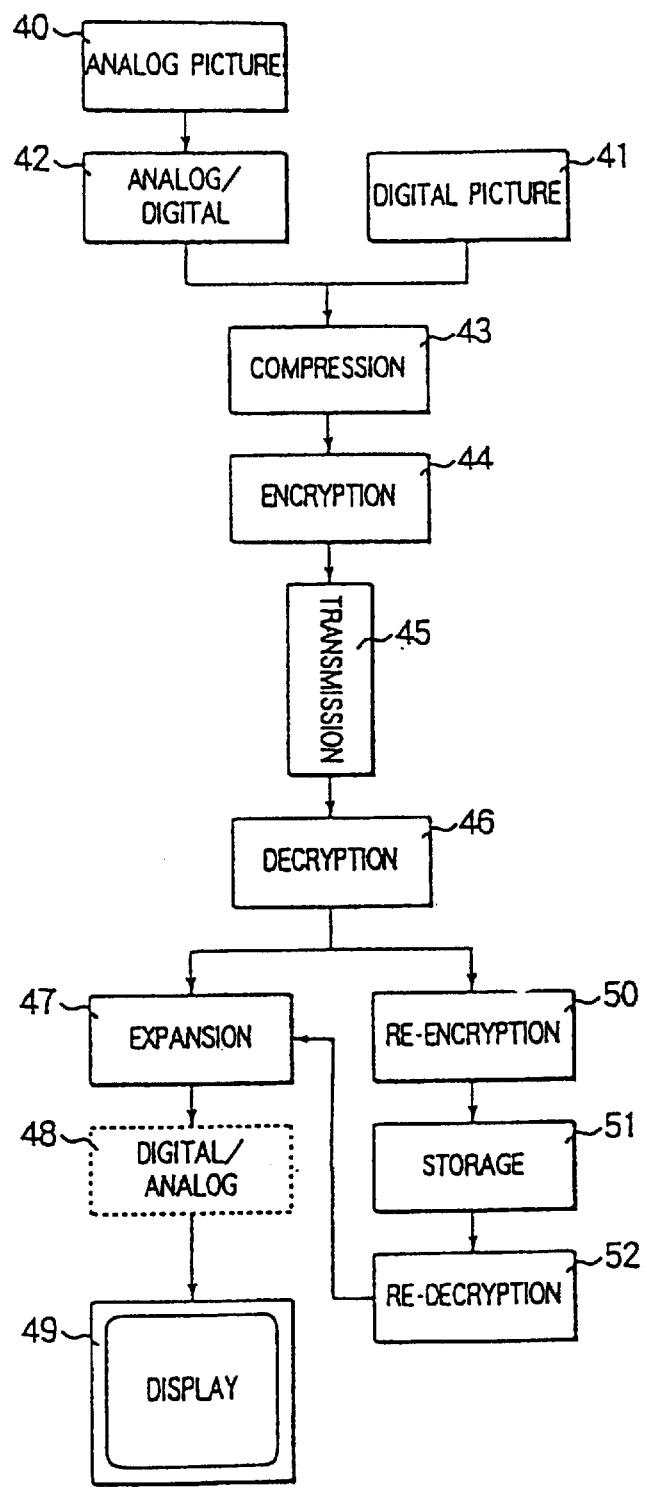
FIG. 5 is a process flow chart of a data copyright management system related to the present invention.

FIG. 5 is an example of data copyright management flow when encrypted data of a digital picture is compressed according to the JPEG or MPEG standard. The flow is divided into transmitting side flow and receiving side flow with a transmit line in between. The receiving side flow is further divided into display flow and storage flow.

The signal process on the transmitting side consists of a process of preparing a digital picture and a process of processing the digital picture prepared. In this process, if an original picture is the digital picture 41, it proceeds to next process. If an original picture is an analog picture 40, a digitizing process 42 is performed.

The digital picture is compressed (43) first according to a given standard such as JPEG or MPEG, then the compressed digital data is encrypted (44) using the first secret-key.

The picture data signal processed on the transmitting side is transmitted through transmission line 45, such as a satellite broadcasting wave, terrestrial broadcasting wave, CATV wave, or public telephone line/ISDN line. Further, recording media such as a digital video tape, a digital video disk, or CD-ROM may be used as the transmission line.

Thus, the picture data transmitted to the receiving side is decrypted (46) first using the first secret key, then the compressed picture data is expanded (47) to be displayed (49). When the display is a digital data display unit, it is directly displayed, however, when it is an analog data display unit, it is converted to analog data 48.

When data is stored in hard disk, flexible disk, optical magnetic disk, writable video disk or the like, it is stored after being re-encrypted (50) using the second secret key.

In redisplaying the picture data that has been re-encrypted and stored, it is re-decrypted (52) using the second secret key and displayed (49). If the display unit is a digital data display unit, it is directly displayed. However, if it is an analog data display unit, it is converted to analog data (48).

For data compression/expansion means and the transmission path, appropriate ones compatible with the data are used.

Figure 6:
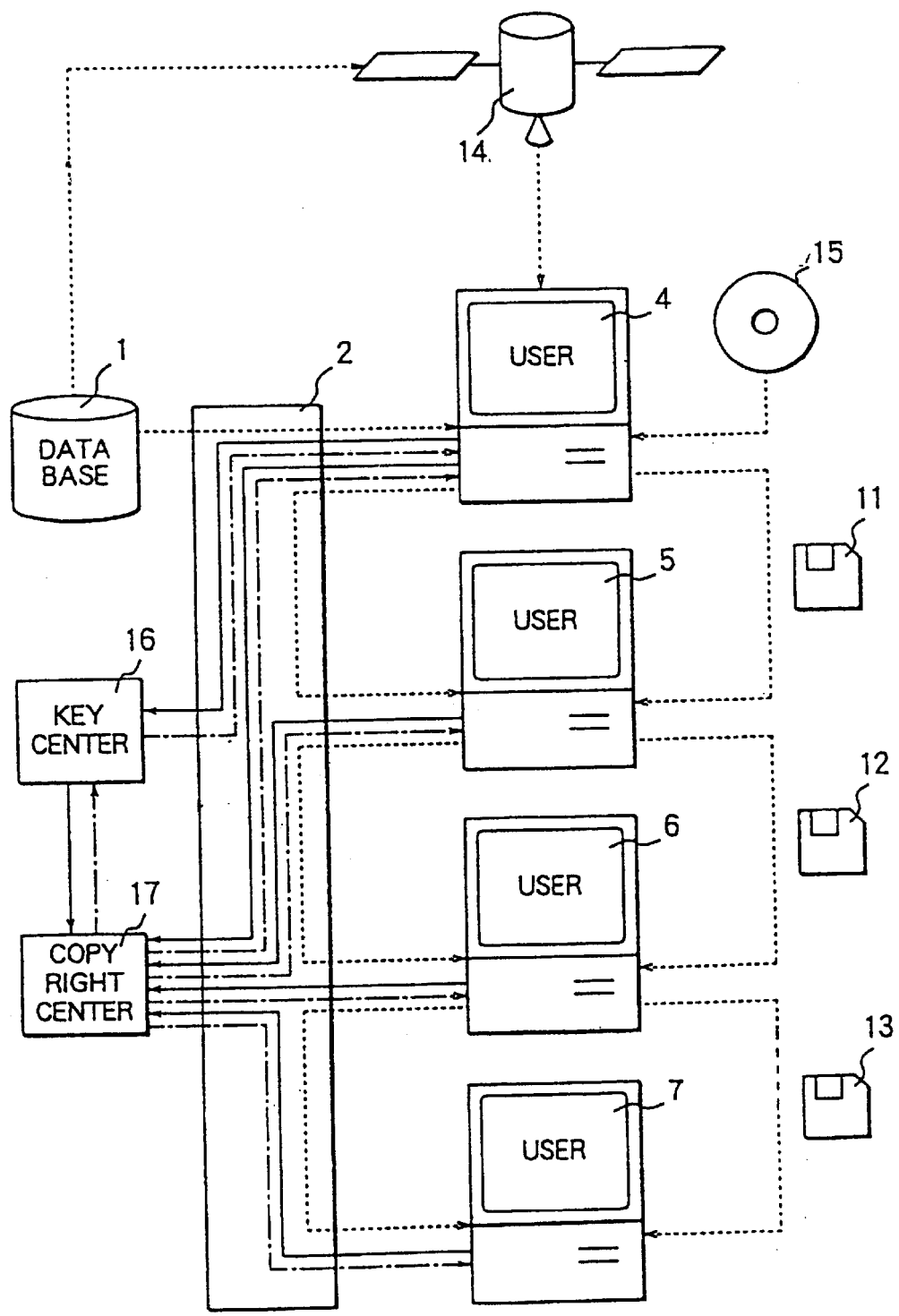
FIG. 6 is a block diagram of the data copyright management system of Japanese Patent Application No. 237673/1994 (U.S. Pat. No. 6,069,952).

FIG. 6 shows an example of the data copyright management system disclosed in the Japanese Patent Application No. 237673/1994 (U.S. Pat. No. 6,069,952). This system uses the secret-key system as a cryptosystem.

In the case of this system, reference numeral 1 represents a database in which text data, binary data serving as a computer graphic display or a computer program, digital audio data, and digital picture data are stored by being encrypted. Reference numeral 14 represents a space satellite such as a communications satellite or a broadcasting satellite. Reference numeral 15 represents a data recorder such as a CD-ROM or a flexible disk. Reference numeral 2 represents a communication network such as a public telephone line offered by a communication enterprise or a CATV line offered by a cable television enterprise. Reference numeral 4 represents a primary user terminal. Reference numeral 16 represents a key control center for managing a secret-key, and reference numeral 17 represents a copyright management center for managing a data copyright.

Reference numerals 5, 6, and 7 represent a secondary user terminal, a tertiary user terminal, and n-order user terminal respectively. Reference numerals 11,12, and 13 represent a secondary disk, tertiary disk, and n-order disk serving as a recording medium such as a flexible disk or CD-ROM respectively. The symbol "n" represents an optional integer. When "n" is larger than four, a corresponding user terminal and a corresponding disk are arranged between the tertiary user terminal 6 and the n-order user terminal 7 and between the tertiary disk 12 and the n-order disk 13 respectively.

In the above arrangement, the database 1, key control center 16, copyright management center 17, primary user terminal 4, secondary user terminal 5, tertiary user terminal 6, and n-order user terminal 7 are connected to the communication network 2.

In FIG. 6, the path shown by a broken line is a path of encrypted data; a path shown by a solid line is a path of requests from each user terminal; and a path shown by a one-dot chain line is a path through which authorization information corresponding to a utilization request and a secret-key are transferred.

Each user who uses this system has been previously entered in the database system. When the user is entered in the system, database utilization software is provided to the user. The database utilization software includes not only normal communication software such as a data communication protocol, but also a program for running a copyright management program.

Original data M0 of text data, binary data as a computer graphic display or computer program, digital audio data, or digital picture data stored in the database 1 or data recording medium 15 is supplied via one-way communication to the primary user terminal 4 via the communication network 2, satellite 14 or recording medium 15. In this case, the data is encrypted with a first secret-key Ks1:

Cm0ks1=E(Ks1, M0).

Even if data is provided with advertisement to be offered free of charge, encryption is necessary in Order to protect the copyright.

It is disclosed in the Japanese Patent Application No. 64889/1994 (U.S. patent application Ser. No. 08/416,037) that the data utilization includes not only displaying of data which is the most basic usage, but also storing, editing, copying, and transferring of the data. A use permit key is prepared which corresponds to one or several forms of usage, and its management is executed by the copyright management program.

Moreover, it is described there that data is encrypted again by the copyright management program for uses such as storing, copying, editing and transferring of the data other than displaying of the data and displaying for editing the data.

In other words, the data whose copyright is claimed is encrypted to be distributed. Only when the data is displayed or displayed for editing the data in a user terminal having a copyright treatment function, is the data decrypted to a plaintext format.

This system disclosed in Japanese Patent Application No. 237673/1994 (U.S. Pat. No. 6,069,952) uses the method described in the Japanese Patent Application No. 64889/1994 (U.S. patent application Ser. No. 08/416,037).

A primary user who desires primary utilization of the supplied encrypted data Cm0ks1 requests for primary utilization of the encrypted original data Cm0ks1 by designating the original data name or the original data number to the key control center 16 via the communication network 2 from the primary user terminal 4. In this case, the primary user must present information Iu1 for the primary user to the key control center 16.

The key control center 16, receiving the primary utilization request from the primary user terminal 4, transfers first secret-key Ks1 for decrypting the encrypted original data Cm0ks1 obtained from the database 1 by the primary user and second secret-key Ks2 for re-encrypting the decrypted original data M0 or edited data M1 from the original data, together with a copyright management program P via the communication network 2 to the primary user terminal 4.

In the primary user terminal 4, receiving the first secret-key Ks1 as a decryption key and the second secret-key Ks2 as an encryption/decryption key, the encrypted original data Cm0ks1 is decrypted by the first secret-key Ks1 using the copyright management program P:

M0=D(Ks1, Cm0ks1)

to use the decrypted original data M0 directly or data M1 as edited.

When the data M, which is the original data M0 or edited data M1, is stored in a memory or a built-in hard disk drive of the primary user terminal 4, only the primary user can use the data. However, when the data M is copied to the external recording medium 11, such as a flexible disk, or transmitted to the secondary user terminal 5 via the communication network 2, a copyright problem due to secondary utilization occurs.

When the original data M0 obtained by the primary user is directly copied and supplied to a secondary user, the copyright of the primary user is not effected on the data M0 because the original data M0 is not modified at all. However, when the primary user produces new data M1 by editing the obtained data M0 or by using means such as combination with other data, the copyright of the primary user, i.e., secondary exploitation right occurring from secondarily utilizing original data, is effected on the data M1.

Similarly, when a secondary user produces new data M2 by editing the original data M0 or edited data M1 obtained from the primary user, or by means such as combination with other data, the copyright of the secondary user, i.e., secondary exploitation right of the secondary user, is also effected.

In this system, to deal with the copyright problem, the data M is encrypted by the second secret-key Ks2 using the copyright management program P when the data M is stored, copied, or transferred. Thereafter, in the primary user terminal 4, the data M is decrypted and encrypted by the second secret-key Ks2:

Cmks2=E(Ks2, M)

M=D(Ks2, Cmks2).

It is free in principle for the primary user to display and edit data to obtain edited data. In this case, however, it is possible to limit the repetitions of the operation by the copyright management program.

When the data M is copied to the external recording medium 11 or transmitted via the communication network 2, the first secret-key Ks1 and the second secret-key Ks2 in the primary user terminal 4 are disused by the copyright management program P. Therefore, when reusing the data M, the primary user makes a request for utilization of the data M to the key control center 16 to again obtain the second secret-key Ks2.

The fact that the user receives the regrant of the second secret-key Ks2 represents secondary utilization of data in which the data M has been copied to the external recording medium 11 or transferred to the secondary user terminal 5 via the communication network 2. Therefore, this fact is entered in the copyright management center 17 from the key control center 16, and subsequent secondary utilization becomes possible.

The data M is moved from the primary user terminal 4 to the secondary user terminal 5 by the external recording medium 11 or the communication network 2. When the data M is copied to the external recording medium 11 or transmitted via the communication network 2, it is encrypted by the second secret-key Ks2.

When the data M is copied to the external recording medium 11 or transmitted via the communication network 2, the first secret-key Ks1 and the second secret-key Ks2 in the primary user terminal 4 are disused. At this time, unencrypted primary user information Iu1 is added to the encrypted data Cmks2 stored in the primary user terminal 4 and when the encrypted data Cmks2 is transferred to the secondary user, the primary user information Iu1 is also transferred.

A secondary user who desires secondary utilization of the encrypted data Cmks2 copied or transmitted from the primary user must designate the original data name or data number to the copyright management center 17 via the communication network 2 from the secondary user terminal 5, and also present the secondary user information Iu2 to the center 17 to request secondary utilization of the data Cmks2. In this time, the secondary user further presents the unencrypted primary user information Iu1 added to the encrypted data Cmks2 in order to clarify the relationship with the primary user.

The copyright management center 17 confirms, in accordance with the presented primary user information Iu1, that the primary user has received a regrant of the second secret-key Ks2 for secondary utilization of the data, and then, transfers the second secret-key Ks2 serving as a decryption key and the third secret-key Ks3 serving as an encryption/decryption key to the secondary user terminal 5 via the communication network 2.

In the secondary user terminal 5 receiving the second secret-key Ks2 and the third secret-key Ks3, the encrypted data Cmks2 is decrypted by the copyright management program P using the second secret-key Ks2.

$$M=D(Ks2, Cmks2)$$

and is secondarily utilized, e.g. displayed or edited.

In this system, the key control center 16 processes primary utilization requests, and the copyright management center 17 processes secondary utilization requests. While the data M supplied to a primary user is encrypted by the first secret-key Ks1, the data M supplied to a secondary user is encrypted by the second secret-key Ks2. Moreover, the first secret-key Ks1 and the second secret-key Ks2 are transferred to the primary user as crypt keys from the key control center 16.

Therefore, if the secondary user, instead of the primary user, falsely issues a request for primary utilization to the key control center 16, the first secret-key Ks1 for decryption and the second secret-key Ks2 for encryption/decryption are transferred to the secondary user. However, the secondary user cannot decrypt the encrypted data Cmks2 by using the first secret-key Ks1 transferred as a decryption key.

Therefore, it is impossible to falsely issue a request for data utilization. Thus, not only the original copyright of data but also the copyright of the primary user on the data is protected.

When storing, copying, or transferring of the data M, other than displaying and displaying for editing is performed in the secondary user terminal 5, the data M is encrypted by the copyright management program P using the third secret-key Ks3 and thereafter, the data is decrypted and encrypted by the third secret-key Ks3:

$$Cmks3=E(Ks3, M)$$
$$M=D(Ks3, Cmks3).$$

It is free in principle for the secondary user to display and edit data to obtain the edited data M2. In this case, it is possible to limit the repetitions of the operation by the copyright management program P.

When the data M is copied to the external recording medium 12 or transmitted via the communication network 2, the second secret-key Ks2 and the third secret-key Ks3 in the secondary user terminal 5 are disused by the copyright management program P. Therefore, when reusing the data M, the secondary user makes a request for the utilization of the data to the copyright management center 17 to again obtain the third secret-key Ks3.

The fact that the secondary user receives a regrant of the third secret-key Ks3 represents secondary utilization of data in which the data M has been copied to the external recording medium 12 or transmitted to the tertiary user terminal 6 via the communication network 2. Therefore, this fact is entered in the copyright management center 17 and allows subsequent data use.

The data M is moved from the secondary user terminal 5 to the tertiary user terminal 6 by the external recording medium 12 or by the communication network 2. When the data M is copied to the external recording medium 12 or transferred via the communication network 2, it is encrypted by the third secret-key Ks3.

When the data M is copied to the external recording medium 12 or transmitted to the tertiary user terminal 6 via the communication network 2, the second secret-key Ks2 and the third secret-key Ks3 in the secondary user terminal 5 are disused. In this case, the unencrypted secondary user information Iu2 is added to the encrypted data Cmks3 stored in the secondary user terminal 5, and when the encrypted data Cmks3 is transferred to a tertiary user, the secondary user information Iu2 is also transferred.

In adding each user information to data, there are two cases: a case in which all information is added to data whenever it is copied or transmitted and another in which the history updated whenever the data is copied or transmitted is stored in the copyright management center.

A tertiary user who desires tertiary utilization of the encrypted data Cmks3 copied or transmitted from the secondary user must designate the original data name or number to the copyright management center 17 from a tertiary user terminal 6 via the communication network 2, and also present the tertiary user information Iu3 to request tertiary utilization of the data. At this time, the tertiary user further presents the unencrypted secondary user information Iu2 added to the encrypted data Cmks3 in order to clarify the relationship with the secondary user.

The copyright management center 17 confirms that the secondary user has received a regrant of the third secret-key Ks3 for preparation of tertiary utilization of data, in accordance with the presented secondary user information Iu2, and then transfers the third secret-key Ks3 serving as a decryption key and fourth secret-key Ks4 serving as an encryption/decryption key to the tertiary user terminal 6 via the communication network 2.

In the tertiary user terminal 6 receiving the third secret-key Ks3 and the fourth secret-key Ks4, the encrypted data Cmks3 is decrypted using the third secret-key Ks3 by the copyright management program P:

M=D(Ks3, Cmks3)

and is tertiarily utilized, e.g. displayed or edited.

In this system, the data M supplied to the primary user is encrypted by the first secret-key Ks1, and the data M supplied to the secondary user is encrypted by the second secret-key Ks2, and the data M supplied to the tertiary user is encrypted by the third secret-key Ks3.

Therefore, if the tertiary user, instead of the primary user, falsely issues a request for primary utilization from the key control center 16, the first secret-key Ks1 for decryption and the second secret-key Ks2 for encryption/decryption are transferred to the tertiary user. However, it is impossible to decrypt the encrypted data Crks3 by the fist secret-key Ks1 transferred as a decryption key. Moreover, if the tertiary user, instead of the secondary user, falsely issues a request for secondary utilization to the copyright management center 17, the second secret-key Ks2 and the third secret-key Ks3 are transferred to the tertiary user as a decryption key and an encryption/decryption key respectively. However, it is impossible to decrypt the encrypted data CmKs3 by the second secret-key Ks2 transferred as a decryption key.

Therefore, it is impossible to falsely issue a request for data utilization. As a result, not only the original copyright of the data, but also the copyrights of the primary and secondary users on the data are protected. The same procedure is applied to quaternary and subsequent utilization.

In the above described system, the database 1, key control center 16, and copyright management center 17 are separately arranged. However, it is not always necessary to arrange them separately. It is also possible to set all of them or two of them integrally.

Moreover, it is also possible for the primary user to issue a request for a regrant of the second secret-key not to the key control center 16 but to the copyright management center 17.

In FIGS. 7(a) and 7(b), signal process flow in a data editing method of digital video or digital audio is shown. An edit flow as generally processed is shown in 7(a). An edit flow which can avoid deterioration of signals is shown in 7(b).

In the edit flow shown in 7(a), signals supplied as digital signals 61 are converted to analog signals (62). The analog signals are then edited (63) while being displayed (64), and the edited analog signals are redigitized (65) to be stored, copied, and transferred (66).

Though this process may be simple, it can not avoid the deterioration of signals since the signal is edited in analog form and re-digitized after completion of editing.

In the edit flow shown in 7(b), digital signals 61 are converted to analog signals (62) to be displayed. While the analog signals (62) are used in editing (63), the analog signals are used only for displaying (64) rather than for storing, copying, transferring.

Signals for storage, copy, and transfer are edited (67), copied, and transferred (66) in the form of digital signals 61 corresponding to signals displayed in analog.

In the case of this edit flow, there is no deterioration of signals since digital signals which are stored, copied, and transferred are never converted to analog signals.

Figure 8A:
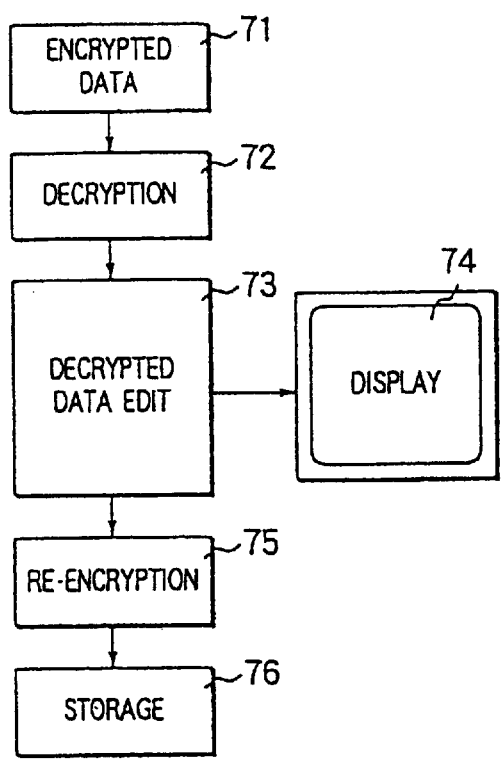
FIG. 8 is a flow chart of an encrypted data editing process of the present invention.
Figure 8B:
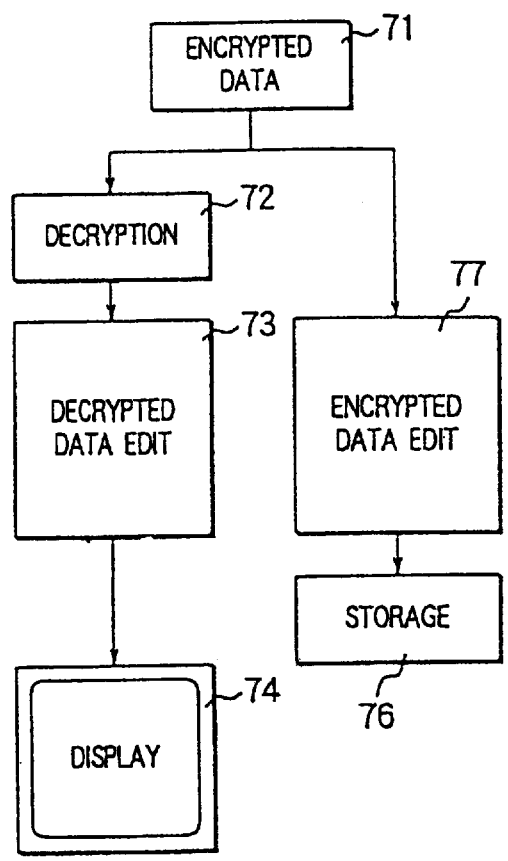

FIGS. 8(a) and 8(b) illustrate flow examples when editing encrypted data to which a signal process of the data editing method of digital video or digital audio shown in FIGS. 7(a) and 7(b) is applied. FIG. 8(a) shows a simplified signal processing flow, and FIG. 8(b) shows a signal processing flow which allows sufficient copyright management.

In the signal processing flow shown in 8 (a), the original data (71) Cm0ks1, encrypted using the first secret-key Ks1 and supplied, is initially decrypted (72) using the first secret key Ks1:

M0=D(Ks1, Cm0ks1), and the decrypted data M0 is then edited (73) while being displayed (74). The data M1 completed editing is re-encrypted (75) using the second secret key Ks2:

Cm1ks2=E (Ks2, M1)

and stored, copied, and transferred (76).

Though the process may be simple, copyright can not be properly managed since there is a possibility that the decrypted data might be stored, copied, or transferred due to the data editing process in decrypted form.

On the other hand, in the signal processing flow shown in 8(b), the original data (71) Cm0ks1, encrypted using the first secret key Ks1, is decrypted (72) using the first secret-key Ks1:

M0=D (Ks1, Cm0ks1).

and the decrypted data M0 is displayed (74).

Meanwhile, the encrypted data Cm0ks1 is edited (73), lead by the decrypted data M0, and the original data M0 for storage or the edited data M1 are re-encrypted using the second secret-key:

Cm0ks2=E (Ks2, M0)

Cm1ks2=E (Ks2, M1), and the encrypted data Cm0ks2 or Cm1ks2 is stored, copied, and transferred (76).

Without being decrypted corresponding to the decrypted and displayed data, it is edited (77) in the encrypted form, and the editing program and the data still encrypted are used to store, copy or transfer (76).

In this signal processing flow, the decrypted data are never stored, copied, or transferred since the data for storing, copying, transferring remain encrypted.

In the data copyright management system which utilizes the data copyright management apparatus of the present invention, when data is decrypted for use when the obtained encrypted data are displayed/edited, data copyright is managed by encrypting data when obtained or edited data is stored/copied/transferred.

However, the data copyright management unit 15 of the Japanese patent application No. 237673/1994 (U.S. Pat. No. 6,069,952) shown in FIG. 2 and the data copyright management unit 30 of the present invention described in FIG. 3 can perform only one process of decryption of encrypted data or encryption of decrypted data. When decrypted or edited data is stored/copied/transferred, therefore, it is necessary to store data in the user terminal or RAM of the data copyright management apparatus to re-encrypt the stored data afterwards. Thus, there is a possibility that decrypted or edited data might be lost due to accident or misoperation. This also limits the volume of data that can be processed.

With the exception of some high-class MPU, general MPU used in personal computers does not take into account the multiprocessor configuration which allows concurrent operation of plural microcomputers. Therefore, plural operations can not be performed at the same time, although accessory units are connected to the system bus of the personal computer.

Figure 2:
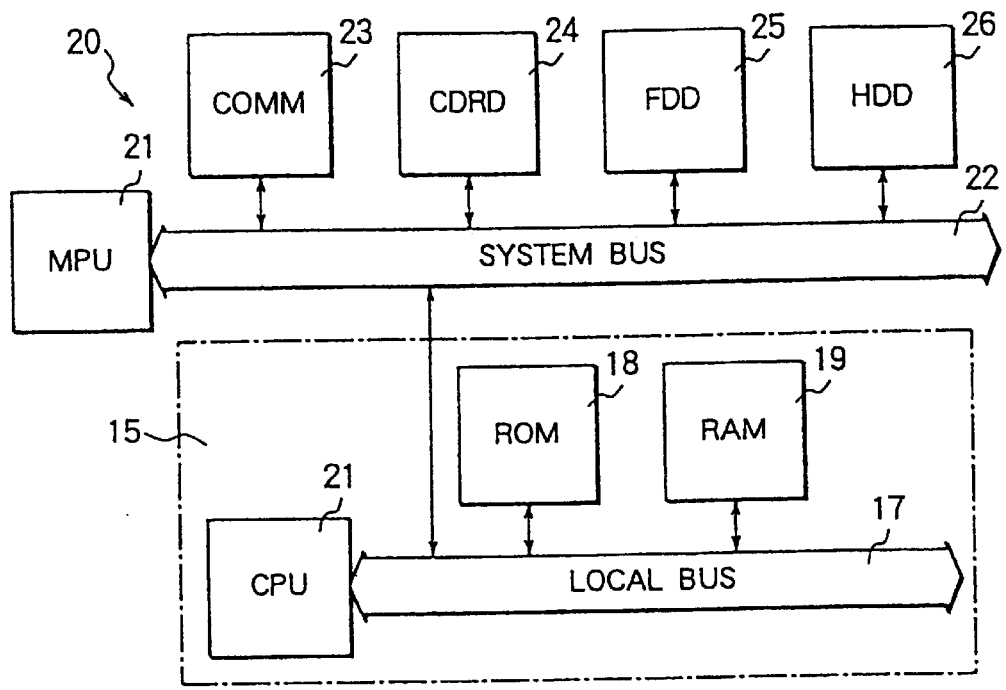
FIG. 2 is a block diagram of the data copyright management apparatus of Japanese Patent Application No. 237673/1994 (U.S. Pat. No. 6,069,952).

Accordingly, to connect the data copyright management unit 15 shown in FIG. 2 or the data copyright management unit 30 shown in FIG. 3 to the system bus 22 of the user terminal 20 does not provides multiprocessor function that enables concurrent operation of MPU 21 or 46 and CPU 16, and the processes of decryption of encrypted data and re-encryption of decrypted data are performed alternately, not concurrently. Thus, a large amount of data can not be processed since the data to be encrypted and decrypted is limited by the capacity of RAM. Further, it is impossible to increase the processing speed, even if the amount of data is not large.

On the other hand, in the data copyright management system described in the Japanese Patent Application, encrypted data that is obtained is decrypted to use for displaying or editing, and when the obtained or edited data is stored, copied, or transferred, it is re-encrypted to prevent unauthorized use of the data. Therefore, it is desirable that the apparatus in the data copyright management system of the present invention perform not only decryption but also re-encryption of data at the same time.

Recently, a PCI (Peripheral Component Interconnect) bus has attracted attention as a means for implementing a multiprocessor configuration of a typical personal computer.

The PCI bus is a bus for external connection connected to a system bus of a personal computer via a PCI bridge. The PCI bus allows implementation of a multiprocessor configuration.

Figure 9:
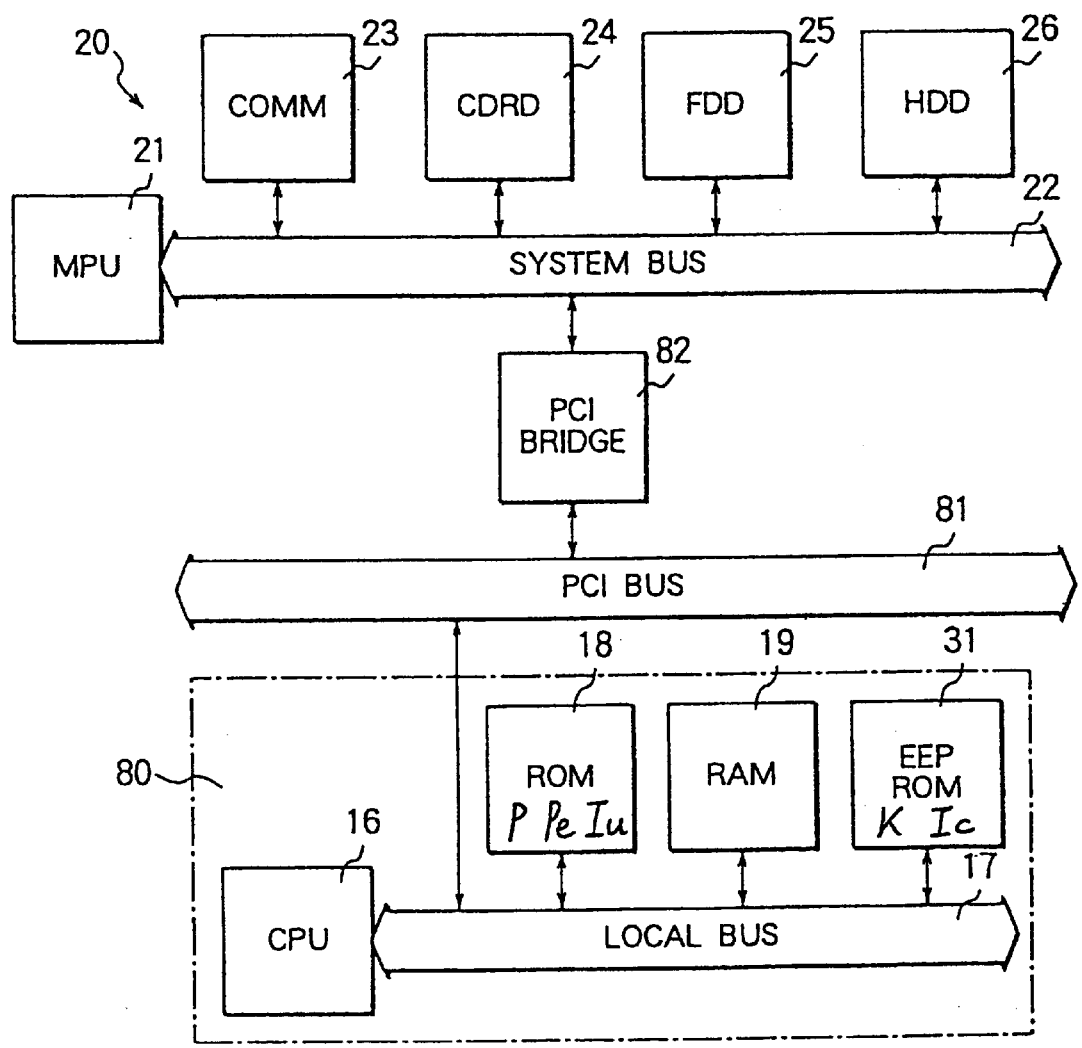
FIG. 9 is a block diagram of the data copyright management apparatus of a second embodiment of the present invention.

FIG. 9 shows another embodiment of this invention, which is a configuration of data copyright management apparatus using a PCI bus and the same configuration of data copyright management unit 30 as shown in FIG. 3, that is, a computer configuration having a CPU 16, a local bus 17 for the CPU 16, and ROM 18, RAM 19, and EEPROM 31 connected to the local bus 17.

In a user terminal 20, a PCI bus 81 is connected to a system bus 22 for a microprocessor 21 via a PCI bridge 82, and the local bus 17 for the CPU 16 of a data copyright management apparatus 80 is connected to the PCI bus 81. Also connected to the system bus 22 of the user terminal 20 are a communications device (COMM) 23 which receives data from external databases and transfers data to the external of the terminal, a CD-ROM drive (CDRD) 24 which reads data supplied on CD-ROM, a flexible disk drive (FDD) 25 which copies received or edited data to supply to the external of terminal, and hard disk drive (HDD) 26 used for storing data. COMM 23, CDRD 24, FDD 25, and HDD 26 may also be connected to the PCI bus 81. While ROM, RAM etc., of course, are connected to the system bus 22 of the user terminal, these are not shown in FIG. 9.

Configurations and operations of other parts are the same as the embodiment shown in FIG. 3, and further explanation of them will be omitted.

A decryption task is performed by the MPU 21 of the user terminal 20 and a re-encryption task is performed by the CPU 16 of the data copyright management apparatus 80 at the same time, and vice versa. Since the configuration of the MPU21 and CPU 16 in this embodiment is a multiprocessor configuration which performs parallel processing with a PCI bus, high processing speed can be achieved.

Other typical means for attaching external devices to a personal computer include SCSI (Small Computer System Interface), which is used for the connection of an external storage medium such as hard disk drives and CD-ROM drives.

Up to eight devices, including the personal computer itself to which the SCSI is attached, can be connected to the SCSI, and a plurality of computers may be included in the eight devices. Each of these computers can play an equivalent role; in other words, the SCSI functions not only as an interface, but also as a multiprocessor bus.

Taking advantage of this function of the SCSI, yet another embodiment connects a data copyright management apparatus 85 to the system bus 22 of a user terminal 20 via SCSI 86 (hereinafter called the "SCSI bus," for clear understanding) instead of the PCI bus 81 in the embodiment shown in FIG. 9.

Figure 10:
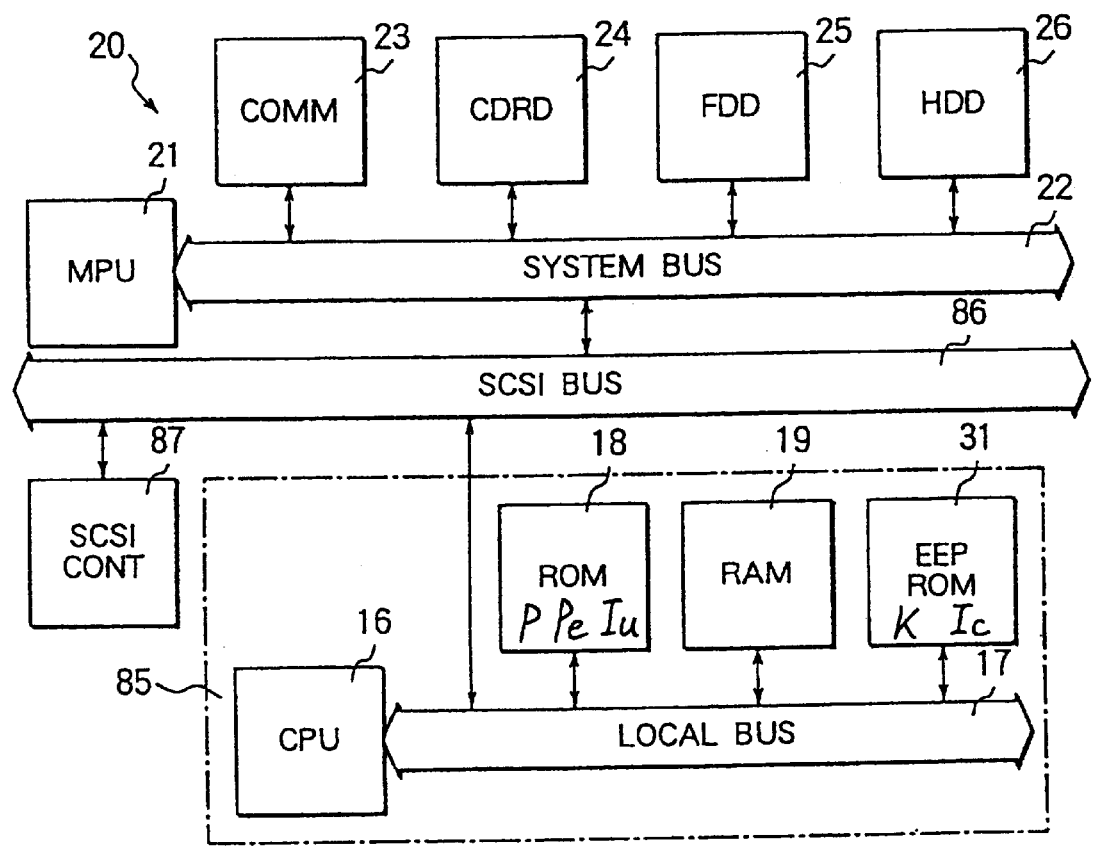
FIG. 10 is a block diagram of the data copyright management apparatus of a third embodiment of the present invention.

FIG. 10 shows a configuration block diagram of a data copyright management apparatus of this embodiment which uses the SCSI bus according to the present invention.

In FIG. 10, the configuration of the data copyright management apparatus 85 is the same as the data copyright management apparatus shown in FIG. 3; that is, the apparatus has a CPU 16, a local bus 17 for the CPU 16, and ROM 18, RAM 19, and EEPROM 31 connected to the local bus 17.

On the other hand, an SCSI bus 86, which is controlled by an SCSI controller (SCSICONT) 87, is connected to a system bus 22 for a microprocessor 21 of a user terminal 20, and the local bus 17 for the CPU 16 of a data copyright management apparatus 85 is connected to this SCSI bus 86.

Also connected to the system bus 22 of the user terminal 20 are a communications device (COMM) 23 which receives data from external databases and transfers data external to the terminal, a CD-ROM drive (CDRD) 24 which reads data supplied on CD-ROM, a flexible disk drive (FDD) 25 which copies received or edited data to supply external to the terminal, and hard disk drive (HDD) 26 used for storing data. COMM 23, CDRD 24, FDD 25, and HDD 26 may also be connected to the SCSI bus 86. While ROM, RAM etc., of course, are connected to the system bus 22 of the user terminal, these are not shown in FIG. 10.

Configurations and operations of other parts are the same as the embodiment shown in FIG. 3, and further explanation of them will be omitted.

A decryption task is performed by the MPU 21 of the user terminal 20, and a re-encryption task is performed by the CPU 16 of the data copyright management apparatus 85 at the same time, and vice versa. Since the configuration of the MPU 21 and CPU 16 in this embodiment is a multiprocessor configuration which performs parallel processing with an SCSI bus 86, high processing speed can be achieved.

Other means for implementing a multiprocessor configuration, such as SCI (Scaleable Coherent Interface), may be used, and, if possible, the microprocessors may be connected with each other without using a bus.

Data to be managed by the data copyright management apparatus of the present invention includes, in addition to text data, graphic data; computer programs, digital audio data, JPEG-based still picture data, and MPEG-based moving picture data.

The above-mentioned multiprocessor configuration of the data copyright management apparatus 80 of the embodiment shown in FIG. 9 and the data copyright management apparatus 85 of the embodiment shown in FIG. 10 is implemented by connecting the apparatus to the system bus 22 of the microprocessor 21 in the user terminal 20 via a PCI bus or a SCSI bus. In such a multiprocessor configuration, the MPU 21 of the user terminal 20 must also control the overall system. For relatively slow-speed and small data such as text data and graphic data, data copyright management with encryption and re-encryption can be performed by the multiprocessor configuration using the MPU 21 and CPU 16. For JPEG still-picture-based moving picture data and MPEG1 or MPEG2-based moving picture data however, data copyright management by such configuration is considerably difficult to perform because a large amount of data must be processed quickly.

Figure 11:
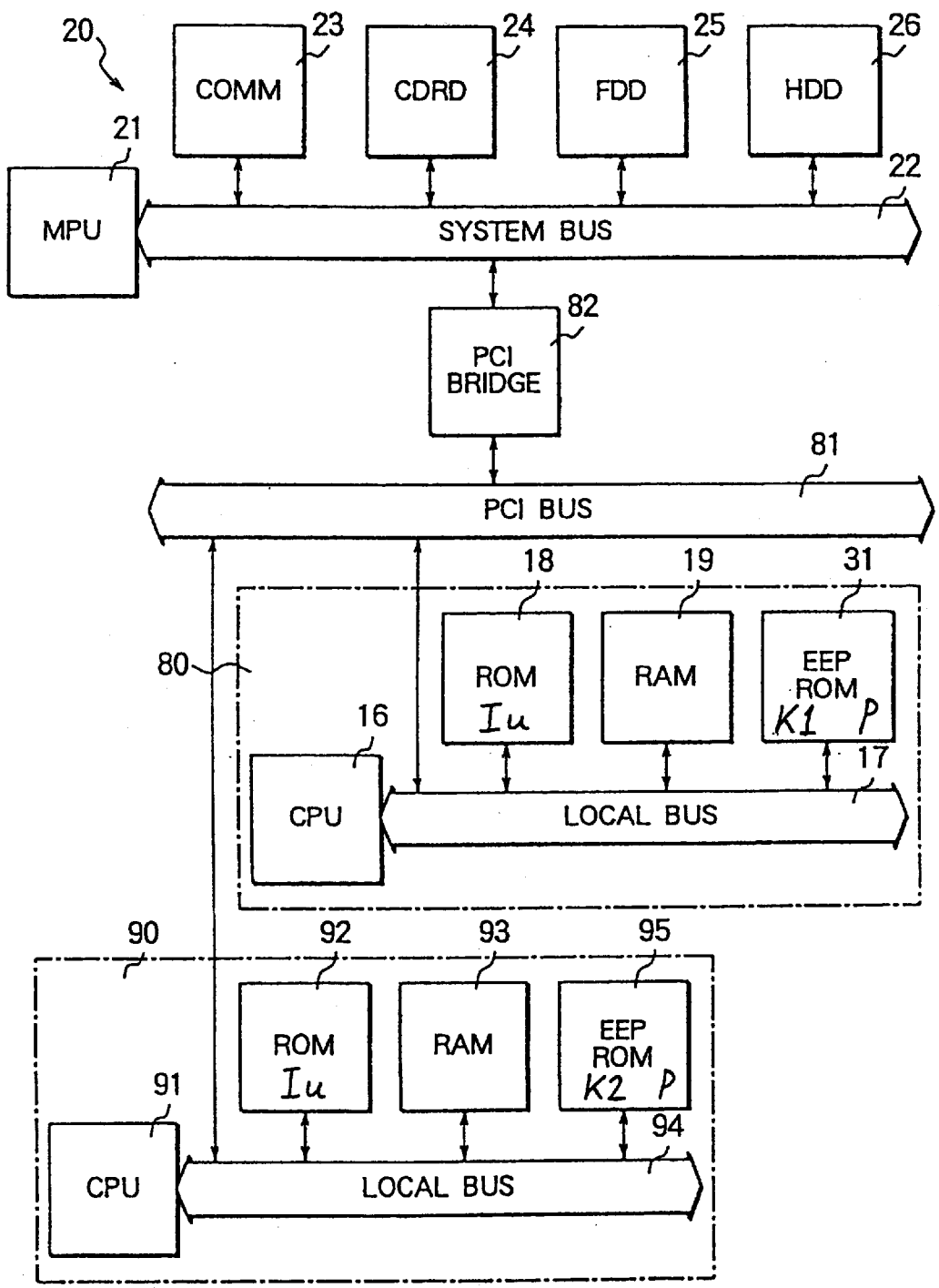
FIG. 11 is a block diagram of the data copyright management apparatus of a fourth embodiment of the present invention.

To deal with this problem, a multiprocessor system is configured by connecting a first data copyright management apparatus 80 and a second data copyright management apparatus 90 to a PCI bus 81 in the embodiment shown in FIG. 11.

The configuration of the second data copyright management apparatus 90 is the same as that of the first data copyright management apparatus 80; that is, the apparatus comprises a CPU 91, a local bus 94 for the CPU 91, and ROM 92, RAM 93, and EEPROM 95 connected to the local bus 94.

In this embodiment, the first data copyright management apparatus 80 decrypts encrypted data and the second data copyright management apparatus 90 re-encrypts decrypted data.

Fixed information, such as software for utilizing databases (i.e., a data copyright management system program) and user data Iu, are stored in the ROM 18 of the first data copyright management apparatus 80 decrypting encrypted data. A first crypt-key Ks1 for decryption and data copyright management system program Ps supplied by a key control center or copyright management center are stored in the EEPROM 31.

Similarly, fixed information, such as software for utilizing databases and user data, are stored in the ROM 92 of the second data copyright management apparatus 90 re-encrypting decrypted data, and a second crypt-key Ks2 and data copyright management system program Ps supplied by a key control center or copyright management center are stored in the EEPROM 95.

In this multiprocessor configuration, SCSI or SCI may be used, and, if possible, the microprocessors may be connected to each other without using a bus.

In the Japanese Patent Application No. 237673/1994 (U.S. Pat. No. 6,069,952) shown in FIG. 2 and in the embodiment of the present invention described with reference to FIG. 3, the communications device (COMM) 23, to which encrypted data is supplied, and the CD-ROM drive (CDRD) 24 are connected to the system bus of the user terminal 20. To decrypt encrypted data, therefore, the encrypted data must be transmitted by way of the system bus of the user terminal 20 and the local bus of the data copyright management apparatus, and consequently, the processing speed can be slowed. This is true for a configuration in which those attached devices are connected to a PCI bus or SCSI bus.

Figure 12:
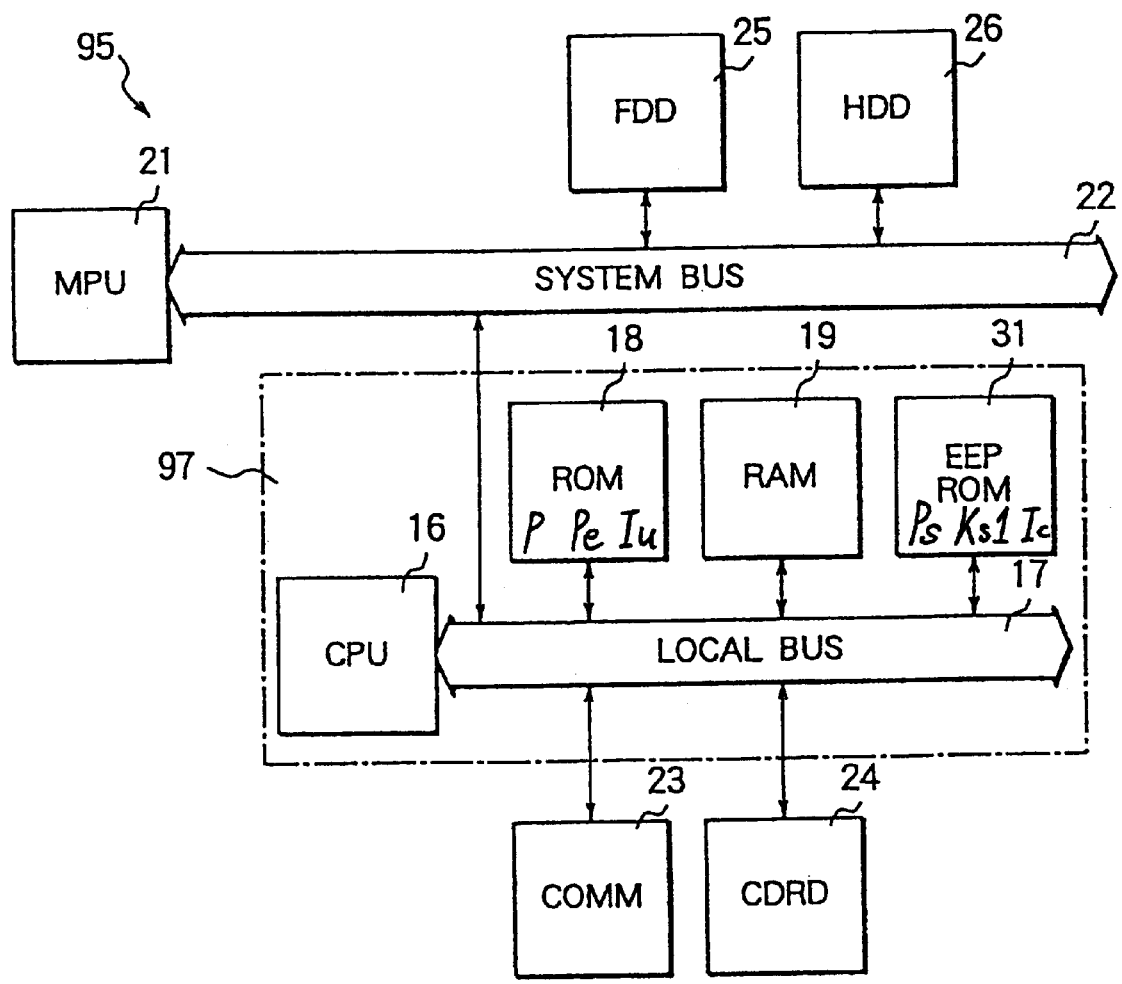
FIG. 12 is a block diagram of the data copyright management apparatus of a fifth embodiment of the present invention.

In another embodiment of the present invention shown in FIG. 12, a communications device 23 to which encrypted data is supplied and a CD-ROM drive 24 are connected to a local bus 17 of a data copyright management apparatus 97 for decryption, to prevent processing speed from being slowed.

The data copyright management apparatus 97 of the embodiment shown in FIG. 12 is a data copyright management apparatus for decryption, and its configuration is essentially the same as that of the data copyright management apparatus 30 of the embodiment shown in FIG. 3; that is, the computer system has a CPU 16, a local bus 17 for CPU 16, and ROM 18, RAM 19 and EEPROM 31 connected to the local bus 17, and a communication device COMM 23 and a CD-ROM drive CDRD 24 connected to the local bus 17.

Fixed information, such as a copyright management program P, a cryptography program Pe based on a crypt algorithm, and user data Iu, are stored in the ROM 18.

Copyright information Ic is stored in the EEPROM 31. If the copyright management program and cryptography program are supplied externally, such as from databases; those programs are stored in the EEPROM 31, rather than in the ROM 18.

A crypt-key Ks1 for decryption and a data copyright management system program Ps supplied from a key control center or copyright management center are stored in the EEPROM 31.

Encrypted data supplied from the COMM 23 or CDRD 24 is decrypted by the data copyright management apparatus 97 and transferred to a user terminal 95.

While the above-mentioned data copyright management apparatus 80 and 90 of the embodiment (shown in FIG. 11) are described as being configured separately, these apparatus, of course, can be configured as a unit.

Figure 13:
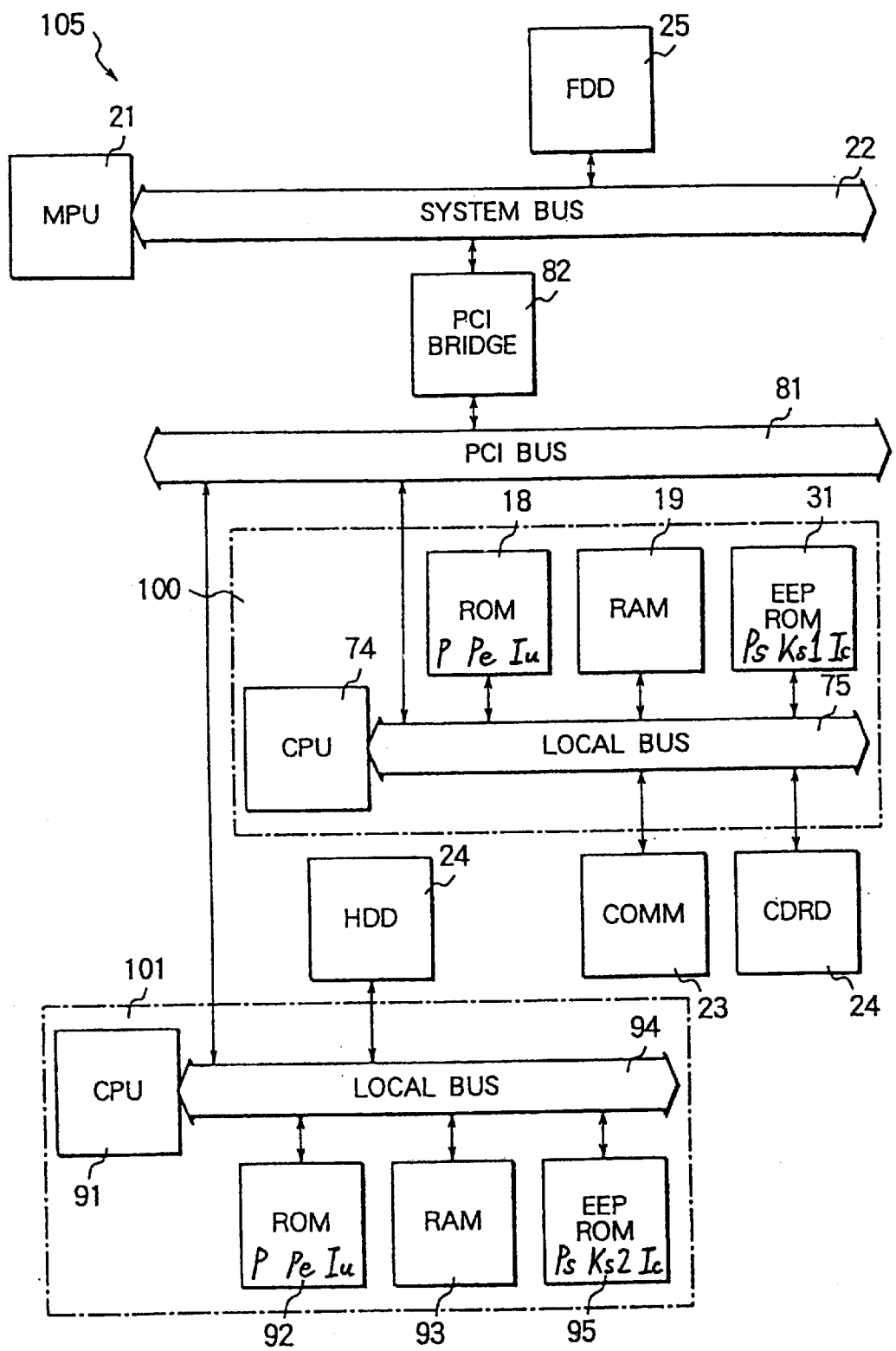
FIG. 13 is a block diagram of the data copyright management apparatus of a sixth embodiment of the present invention.

FIG. 13 shows another embodiment of a data copyright management apparatus which is extended from the data copyright management apparatus 97 described with reference to FIG. 12.

In the Japanese Patent Application No. 237673/1994 (U.S. Pat. No. 6,069,952) shown in FIG. 2 and the embodiment described with reference to FIG. 3, the storage medium, such as HDD 26, for storing re-encrypted data, are connected to the system bus 22 of the user terminal 20. To store re-encrypted data, therefore, the encrypted data must be transmitted by way of the system bus 22 of the user terminal 20 and the local bus 17 of the data copyright management unit 15 or data copyright management unit 30, and consequently, processing speed can be slowed. This is true for a configuration in which those attached devices are connected to a PCI bus or SCSI bus.

In the data copyright management apparatus 100 of the embodiment shown in FIG. 13, in addition to the communications device COMM 23 and the CD-ROM drive CDRD 24 connected to the local bus 17 in the data copyright management apparatus 97 for decryption in the embodiment shown in FIG. 12, storage devices such as HDD 26 for storing re-encrypted data are connected to the local bus 94 of the data copyright management apparatus 101 for re-encryption.

The configuration of the data copyright management apparatus 101 for re-encryption in the embodiment shown in FIG. 13 is essentially the same as that of the data copyright management unit 30 shown in FIG. 3; that is, the computer system has a CPU 91, a local bus 94 for the CPU 91, and ROM 92, RAM 93 and EEPROM 95 connected to the local bus 94, and HDD 26 is connected to the local bus 94.

Fixed information, such as a copyright management program P, a cryptography program Pe based on a crypt algorithm, and user data Iu, are stored in the ROM 92.

Copyright information is stored in the EEPROM 95. If the copyright management program and cryptography program are supplied externally such as from databases, those programs are stored in the EEPROM 95 rather than the ROM 92. A crypt-key Ks2 for re-encryption and a data copyright management system program Ps supplied from a key control center or copyright management center are stored in the EEPROM 95. Data re-encrypted by the copyright management apparatus 101 for re-encryption is stored in HDD 26.

While the above-mentioned data copyright management apparatus 100 and 101 of the embodiment shown in FIG. 13 are described as being configured separately, these apparatus, of course, can be configured as a unit.

Digital data includes, in addition to text data, graphic data, computer programs, digital sound data, JPEG-based still picture data, and MPEG-based moving picture data.

A typical user terminal which utilizes copyrighted data is a computer apparatus such as a personal computer. Other apparatus which utilize such data are receivers such as television sets, set-top boxes used with those receivers, digital recording apparatus such as digital video tape recorders, digital video disk recorders, digital audio tapes (DAT) which store digital data, and personal digital assistants (PDA).

The data copyright management apparatus shown in FIG. 2 which is configured as an expansion board, IC card, or PC card and described in the Japanese Patent Application No. 237673/1994 (U.S. Pat. No. 6,069,952) or the data copyright management apparatus shown in FIG. 3 may be used by attaching it to a user terminal which is a computer, receiver, set-top box, digital recording medium, or PDA. However, it is desirable that a data copyright management apparatus is factory-installed in the user terminal to eliminate labor and possible failure arising from the attachment of the apparatus.

To accomplish this, in each embodiment of the present invention, a data copyright management apparatus is implemented in the form of a monolithic IC, hybrid IC, or built-in subboard and is incorporated in a user terminal such as computer apparatus or personal computers, or receivers such as television sets, set-top boxes used with those receivers, digital recording medium such as digital video tape recorders, digital video disk recorders, and digital audio tape (DAT) which store digital signals, or personal digital assistants (PDA).

Further, the apparatus for managing data copyright described above can be applied not only to the data utilization but also to the handling of the digital cash and video conference systems.

The digital cash system which has been proposed so far is based on a secret-key cryptosystem. The encrypted digital cash data is transferred from a bank account or a cash service of a credit company, and is stored in the IC card so that a terminal device for input/output is used to make a payment. The digital cash system which uses this IC card as an electronic cash-box can be used at any place such as shops or the like as long as the input/output terminal is installed. However, the system cannot be used at places such as homes or the like where no input/output terminal is installed.

Since the digital cash is encrypted data, any device can be used as the electronic cash-box which stores digital cash data, in addition to the IC card, as long as the device can store encrypted data and transmit the data to the party to which the payment is made. As a terminal which can be specifically used as the electronic cash-box, there are personal computers, intelligent television sets, portable telephone sets such as a personal information terminal, personal handy phone system (PHS), intelligent telephone sets, and PC cards or the like which have an input/output function.

Trades in which such terminals are used as an electronic cash-box for a digital cash can be actualized by replacing, in the configuration of the data copyright management system, the database with a customer's bank, a first user terminal with a customer; the secondary user terminal with a retailer, the copyright control center with a retailer's bank, and a tertiary user terminal with a wholesaler or a maker.

An example of the trading system will be explained in FIG. 14 in which the digital cash is transferred via a communication network.

Figure 1:
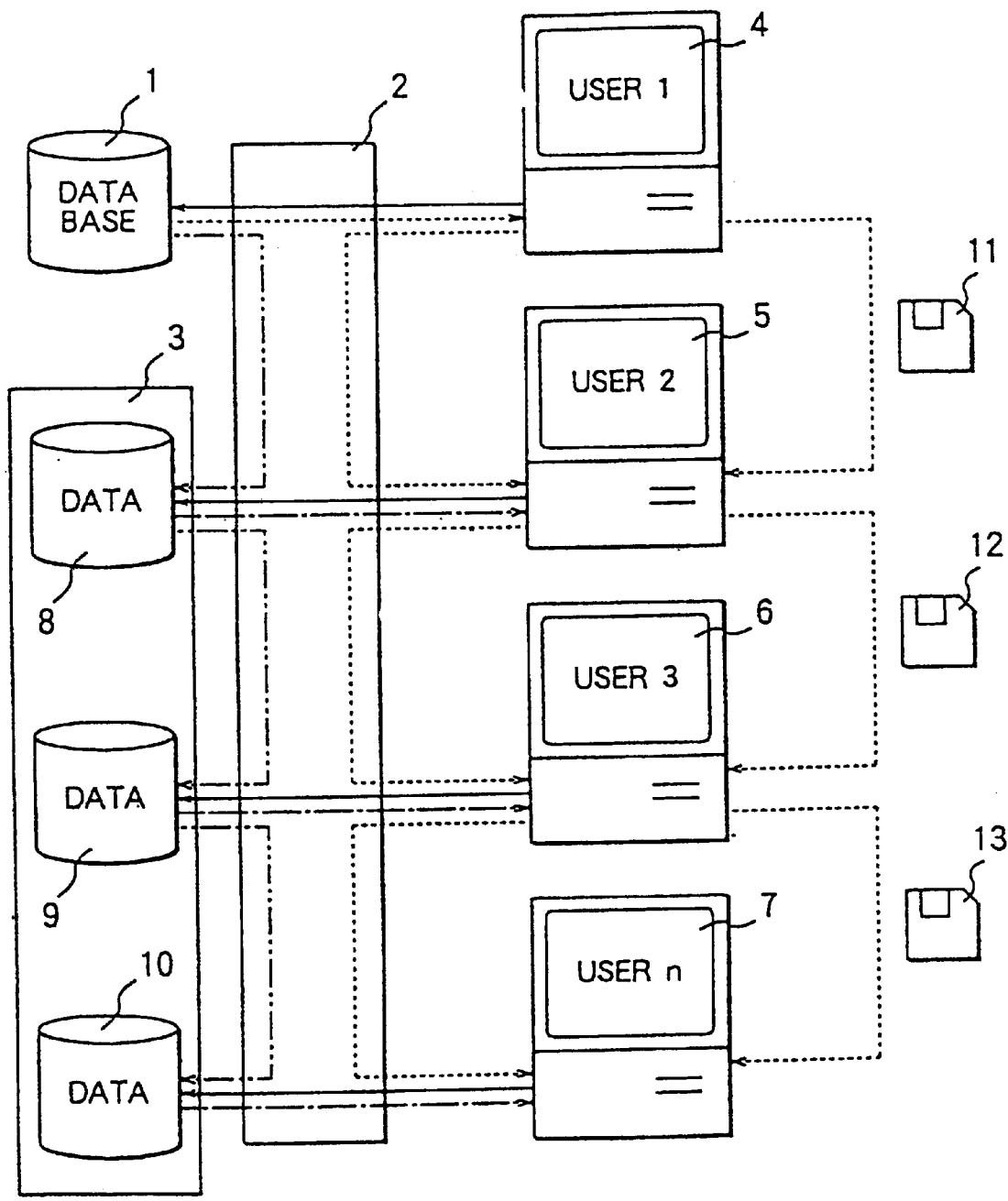
FIG. 1 is a block diagram of the data copyright management system of Japanese Patent Application No. 237673/1994 (U.S. Pat. No. 6,069,952).

The example uses the configuration of the data copyright management system shown in FIG. 1. In FIG. 14, reference numeral 111 represents a customer, reference numeral 112 a bank of the customer 111, reference numeral 113 a retail shop, reference numeral 114 a bank of the retail shop 113, reference numeral 115 a maker, reference numeral 116 a bank of the maker 115, reference numeral 2 a communication network such as a public line provided by a communication enterprise or CATV line provided by a cable television enterprise. Customer 111, the customer's bank 112, the retail shop 113, the retail shop's bank 114, the maker 115, the maker's bank 116 can be mutually connected with the communication network 2. In this system, the customer 111 can use a credit company offering cashing service other than banks and he can also interpose an appropriate number of wholesalers between the retail shop and the maker.

In addition, reference numerals 117 and 118 are either IC cards or PC cards in which digital cash data is stored. The cards are used when the communication network is not used.

Figure 14:
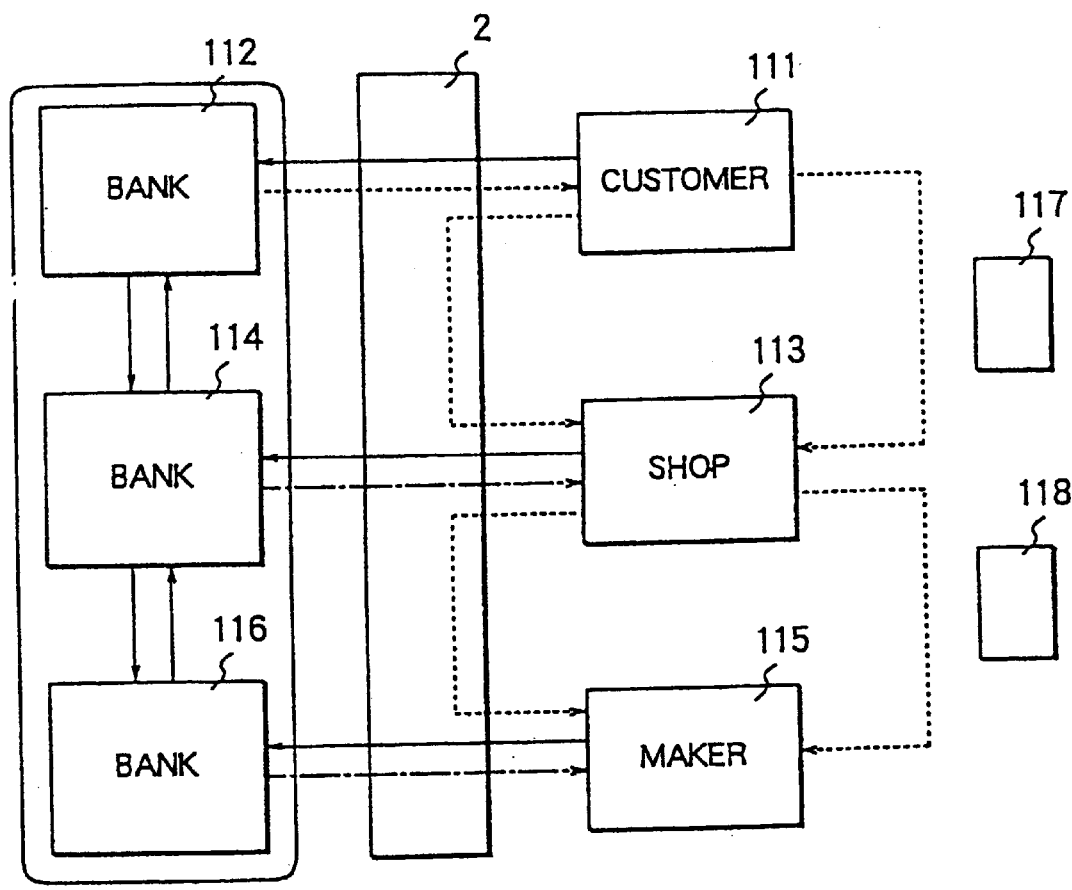
FIG. 14 is a block diagram of the digital cash system as one example of use of the present invention.

Incidentally, in FIG. 14, the broken line represents a path of encrypted digital cash data, the solid line represents a path of requests from the customer, the retail shop or the maker, and the one-dot chain line represents a path of the secret-key from each bank.

In this example, first secret-key prepared by the customer's bank 112, the second secret-key generated by the customer, the third secret-key generated by the retail shop, and the fourth secret-key prepared by the maker are used as crypt keys.

Further, wile the customer's bank 112, the retail shop's bank 114, and the maker's bank 116 are explained as separate entities, these can be considered as a financial system as a whole.

Digital cash management program P for encrypting and decrypting the digital cash data is preliminarily distributed to the customer 111 and is stored in the user terminal. Further, it is possible to transfer the digital cash management program P together with data every time a trade with the bank is executed. Further, it is desirable to install the common digital cash management program P in all banks.

The customer 111 uses the user terminal to designate the amount of money via the communication network 2 to request to be drawn out from the account of the customer's bank 112 to the bank. At this time, the terminal presents customer information Ic of the customer 111.

The customer's bank 112 which receives the customer's request for drawing out from the account selects or generates the first secret-key Ks1 so that the digital cash data M0 of the amount is encrypted by the first secret-key Ks1:

Cm0ks1=E(Ks1, M0)

and the encrypted digital cash data Cm0ks1 and the first secret-key Ks1 for a decrypting key are transferred to the customer 111, and the customer information Ic and the first secret-key Ks1 are stored.

In this case, the first secret-key Ks1 can be selected from what is preliminarily prepared by the customer's bank 112, and also may be generated by presentation of the customer information Ic at the time of drawing by the customer using the digital cash management program P on the basis of the customer information Ic:

Ks1=P(Ic).

Through this means, the first secret-key Ks1 can be private for the customer 111. At the same time, it is not necessary to transfer the first secret-key Ks1 to the customer 111 so that the security of the system can be heightened.

Further, the first secret-key Ks1 can be generated on the basis of the bank information Ibs of the customer's bank 112 or on the basis of the bank information Ibs and the key generation data.

The customer 111 to which the encrypted digital cash data Cm0ks1 and the first secret-key Ks1 are transferred generates second secret-key Ks2 according to any one or both of the customer information Ic and the first secret-key Ks1 using the digital cash management program P, for example:

Ks2=P(Ic), and the generated second secret-key Ks2 is stored in the user terminal.

Further, the customer 111 uses the first secret-key Ks1 to decrypt the encrypted digital cash data Cm0ks1 with the digital cash management program P:

M0=D(Ks1, Cm0ks1), and the content is confirmed. When the decrypted digital cash data M0 whose content is confirmed is stored in the user terminal as a cash-box, it is encrypted by the generated second secret-key Ks2 using the digital cash management program P:

Cm0Ks2=E(Ks2, M0).

The first secret-key Ks1 is disused at this time.

The customer 111 who wishes to buy an article from the retail shop 113 decrypts the encrypted digital cash data Cm0ks2 which is stored in the user terminal as a cash-box by the digital cash management program P using the second secret-key Ks2:

M0=D(Ks2, Cm0ks2), and the digital cash data MI which corresponds to the necessary amount of money is encrypted by the second secret-key ks2 using the digital cash management program P:

Cm1ks2=E(Ks2, M1), and then payment is made by transmitting the encrypted digital cash data Cm1ks2 to the user terminal as a cash-box of retail shop, 113 via communication network 2. At this time, the customer information Ic is also transmitted to the user terminal of retail shop 113, Further, the residual amount digital cash data M2 is encrypted by the second secret-key Ks2 using the digital cash management program P:

Cm2ks2=E(Ks2, M2)

and stored in the user terminal of customer 111.

The retail shop 113 to which the encrypted digital cash data Cm1ks2 and the customer information Ic are transferred stores the transferred encrypted digital cash data Cm1ks2 and customer information Ic in the user terminal and presents the customer information Ic to the retail shop's bank 114 via the communication network 2 for confirming the content to request the transmission of the second secret-key Ks2 for decryption.

The retail shop's bank 114 which is requested by the retail shop 113 to transmit the second secret-key Ks2 transmits the request for the transmission of the second secret-key Ks2 and the customer information Ic to the customer's bank 112.

The customer's bank 112 which is requested to transmit the second secret-key Ks2 from the retail shop's bank 114 generates the second secret-key Ks2 according to the customer information Ic by the digital cash management program P in the case where the second secret-key Ks2 is based only on the customer information Ic, or generates the second secret-key Ks2 according to the customer information Ic and the first secret-key Ks1 by the digital cash management program P in the case where the second secret-key Ks2 is based on the customer information Ic and the first secret-key Ks1, and transmits the generated second secret-key Ks2 to the retail shop's bank 114.

The retail shop's bank 114 to which the second secret-key Ks2 is transmitted from the customer's bank 112 transmits the second secret-key Ks2 to the retail shop 113 via the communication network 2.

The retail shop 113 to which the second secret-key Ks2 is transferred decrypts the encrypted digital cash data Cm1ks2 by the second secret-key Ks2 using the digital cash management program P:

M1=D(Ks2, Cm1ks2)

and, after confirming the amount of money, forwards the article to the customer 111.

Incidentally, in this case, the retail shop 111 can directly request the transfer of the second secret-key Ks2 to the customer's bank 112 instead of the retail shop's bank 114.

In case where the digital cash received by the retail shop 113 is deposited in the account of the retail shop's bank 114, the customer information Ic is transferred to the retail shop's bank 114 together with the encrypted digital cash data Cm1ks2 via the communication network 2.

The retail shop's bank 114 to which the encrypted digital cash data Cm1ks2 and the customer information Ic are transferred requests the transfer of the second secret-key Ks2 to the customer's bank 112 by transmitting the customer information Ic.

The customer's bank 112, which is requested to transfer the second secret-key Ks2 from the retail shop's bank 114, generates the second secret-key Ks2 according to the customer's information Ic by the digital cash management program P when the second secret-key Ks2 is based only on the customer's information Ic, or generates the second secret-key Ks2 according to the customer's information Ic and the first secret-key Ks1 by the digital cash management program P when the second secret-key Ks2 is based on the customer's information Ic and the first secret-key Ks1. Then the generated second secret-key Ks2 is transferred to the retail shop's bank 114.

The retail shop's bank 114, to which the second secret-key Ks2 is transferred from the customer's bank 112, decrypts the encrypted digital cash data Cm1ks2 by the second secret-key Ks2 using the digital cash management program P:

M1=D(Ks2, Cm1ks2), and the decrypted digital cash data M1 is deposited in the bank account of the retail shop's bank 114.

In the general trade system, the retail shop 113 stocks products from the maker 115 or from the wholesaler which intervenes between the retail shop 113 and the maker 115. Then the retail shop 113 sells the products to the customer 111. Consequently, a trading form is present between the customer 111 and the retail shop 113 just as between the retail shop 113 and the maker 115.

The handling of the digital cash between the retail shop 113 and the maker 115 is not basically different from the handling of the digital cash which is carried out between the customer 111 and the retail shop 113. Therefore, the explanation there will be omitted for the sake of clarity.

In this digital cash system, the digital cash is handled through banks. As information such as the processed amount of the digital cash, date; and the secret-key demanding party information with respect to the handling of the digital cash is stored in the customer's bank, the residual amount of digital cash and usage history, can be grasped.

Even in the case where the user terminal (which is an electronic cash-box storing the digital cash data) cannot be used owing to the loss or the breakage, it is possible to reissue the digital cash on the basis of the residual amount and usage history kept in the customer's bank.

It is desirable to add a digital signature to the digital cash data to heighten the security of the digital cash.

In this example, digital cash is added by the customer's information which may be accompanied by digital signature. Therefore, the digital cash in the example can also have a function of a settlement system for cheques drawn by customers.

Also, this system is applicable to various systems in international trade such as payment settlement of import/export by a negotiation by a draft using executed documents such as a letter of credit and a bill of lading.

In a video conference system, a television picture has been added to the conventional voice telephone set. Recently, the video conference system has advanced to the point where a computer system is incorporated into the video conference system so that the quality of the voice and the picture are improved, and data on computers can be handled at the same time as the voice and the picture.

Under these circumstances, security against the violation of the user's privacy and the data leakage due to eavesdropping by persons other than the participants of the conference are protected by the cryptosystem using a secret-key.

However, since the conference content obtained by the participants themselves are decrypted, in the case where participants themselves store the content of the conference and sometimes edit the content, and further, use for secondary usage such as distribution to the persons other than the participants of the conference, the privacy of other participants of the video conference and data security remains unprotected.

In particular, advancements in the compression technology of the transmission data and increases in the volume of the data storage medium means, it will be possible to copy all of the content of the video conference to the data storage medium, or to transmit it via a network.

In view of the circumstances, the example is intended, when video conference participants perform secondary use, to secure the privacy of other participants and data security by using the aforementioned configuration of the data copyright management system.

This video conference data management system can be actualized, for example, by replacing the database in the data copyright management system configuration shown in FIG. 1 with a participant of the video conference, the first user terminal with another participant of the video conference, and the second user terminal with a non-participant of the video conference.

Figure 15:
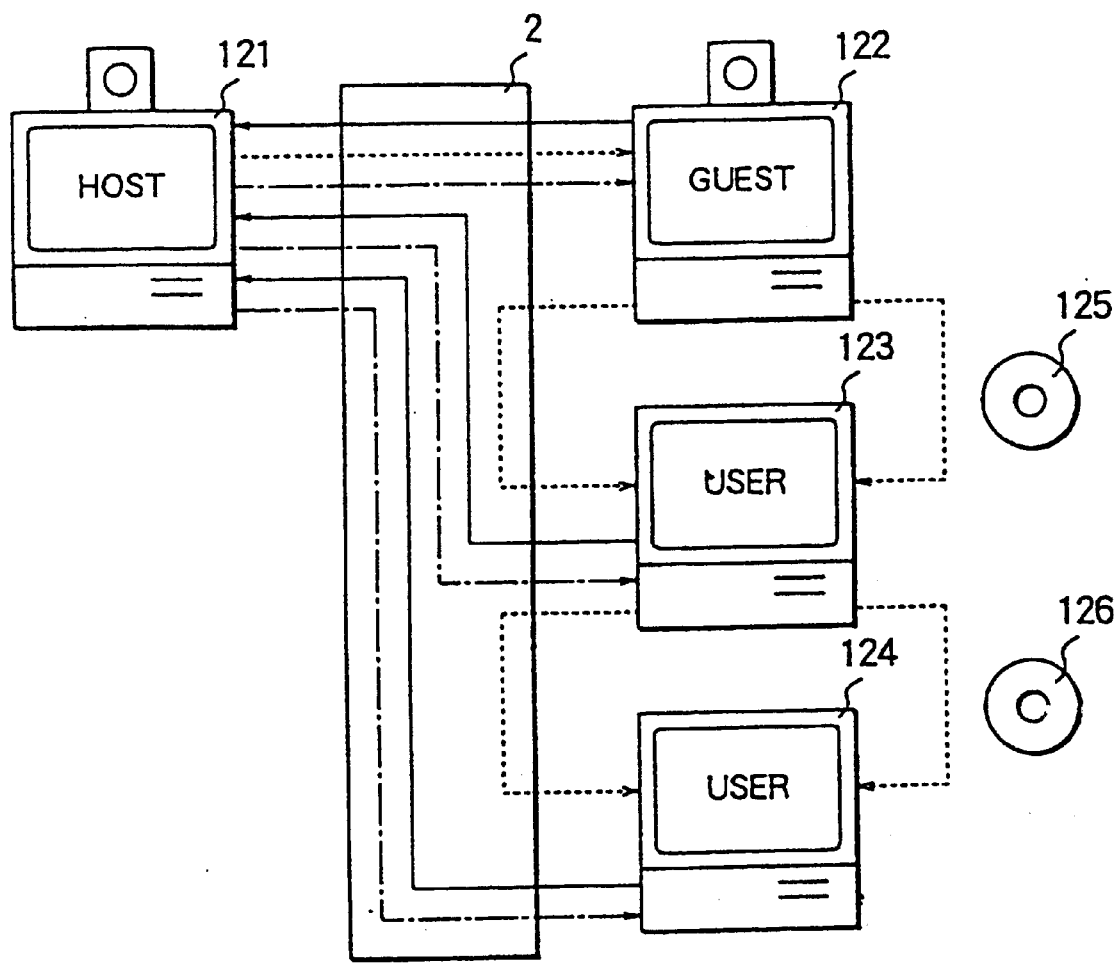
FIG. 15 is a block diagram of the video conference system as one example of use of the present invention.

An example will be explained by using FIG. 15. Referring to FIG. 15, reference numeral 121 represents a participant as a host of the video conference, reference numeral 122 a participant of the video conference as a guest, reference numeral 123 a non-participant of the video conference as a user, reference numeral 124 a non-participant of the video conference as another user, reference numeral 2 a communication network such as a public telephone line provided by the communication enterprise and a CA television line provided by the cable television enterprise or the like. The participant 121 of the video conference is connected to the participant 122 of the video conference via the communication network 2. Further, the participant 122 of the video conference can be connected to the non-participant 123 of the video conference, and the non-participant 123 of the video conference to the non-participant 124 of the video conference, via the communication network 2. Reference numerals 125 and 126 represent a data recording medium.

Referring to FIG. 15, the broken line represents a path of the encrypted video conference content, the solid line represents a path requesting the crypt key from the non-participants of the video conference 123 and 124 to the participant of the television conference 121, and the one-dot chain line represents a path of crypt keys from the participant of the video conference 121 to the participant of the video conference 122 and the non-participants of the video conference 123 and 124.

In this example, a video conference data management system is described here protecting only the data security and privacy of video conference participant 121 to simplify the explanation. It is of course also possible to protect for data security and privacy of video conference participant 122.

A video conference data management program P for encryption/decryption of the video conference data of the participant 121 including audio and picture is previously distributed to the video conference participant 122 and the video conference non-participants 123 and 124, and is stored in each terminal. This video conference data management program P may be transferred whenever a crypt-key is transferred.

In this example, further, a first secret-key prepared by the video conference participant 121, a second secret-key prepared by the video conference participant 122, a third secret-key prepared by the video conference non-participant 123 and subsequent secret-keys prepared similarly are used as a crypt key.

The video conference participant 121 and the video conference participant 122 perform the video conference by transmitting audio, picture and data (referred to as video conference data on the whole) to each other, using each terminal via communication network 2. Prior to the video conference, the video conference participant 121 generates or selects the first secret-key Ks1 to transfer to the video conference participant 122 prior to the start of the video conference.

The video conference participant 122 receiving the first secret-key Ks1 generates the second secret-key Ks2 by the first secret-key Ks1 using the video conference data management program P:

Ks2=P(Ks1).

The generated second secret-key Ks2 is stored in the terminal.

The video conference participant 121 encrypts the video conference data M0 with the first secret-key Ks1, in the video conference through the communication network 2:

Cm0ks1=E(Ks1, M0)

and transfers the encrypted video conference data Cm0ks1 to the video conference participant 122.

The video conference participant 122 who receives the video conference data Cm0ks1 encrypted by the first secret-key Ks1 decrypts the video conference data Cm0ks1 by the first secret-key Ks1:

M0=D(ks1, Cm0ks1)

and uses discreted video conference data M0.

Further, the second secret-key Ks2 is generated based on the first secret-key Ks1 with the video conference data management program P:

Is2=P(Ks1).

In the case where the decrypted video conference data M0 is stored in the terminal of the participant 122 of the video conference, copied to the data record medium 125, or transferred to the non-participant of the video conference via the communication network 2, the data M is encrypted by the second secret-key Ks2 using the video conference data management program P:

Cmks2=E(Ks2, M).

The encrypted data Cmks2 is copied to the record medium 125 or supplied to the non-participant of the video conference via the communication network 2, together with the video conference data name or the video conference data number.

The non-participant of the video conference 123 who obtains the encrypted data Cmks2 makes a request to the participant 121 for the secondary use of the video conference data M from the terminal by specifying the name or number of the video conference data.

The participant 121 of the video conference who receives the request for the secondary use of the data M finds out the first secret-key Ks1 according to the name or the number of the video conference data to generate the second secret-key Ks2 based on the first secret-key Ks1:

Ks2=P(Ks1) and supplies the generated second secret-key Ks2 to the non-participant of the video conference 123.

The non-participant of video conference 123 who receives the second secret-key Ks2 decrypts the encrypted data Cmks2 by the second secret-key Ks2 by using the video conference data management program P:

M=D(Ks2, Cmks2)

and then uses decrypted video conference data M.

In the case where the video conference data M is stored in the terminal of the non-participant of the video conference 123, copied to the record medium 126, or transmitted to the non-participant of the video conference 124, the video conference data M is encrypted by the second secret-key Ks2 using the video conference data management program P:

Cmks2=E(Ks2, M).

Incidentally, the third secret-key Ks3 may be generated on the basis of the second secret-key Ks2 with the video conference data management program P:

Ks3=P(Ks2), and the data M can be encrypted with the video conference data management program P by this generated third secret-key Ks3:

Cmks3=E(Ks3, M).

I claim:

1. A data copyright management apparatus used with a user terminal for utilizing digital data:

said data copyright management apparatus comprising a central processing unit, a central processing unit bus, read-only semiconductor memory, electrically erasable programmable read-only memory, and read/write memory;

wherein:

said central processing unit, said read-only semiconductor memory, said electrically erasable programmable read-only memory, and read/write memory are connected to said central processing unit bus, and a system bus of said user terminal is able to be connected to said central processing unit bus;

a data copyright management system program, and user information are stored in said read-only semiconductor memory;

a first public-key, a first private-key, a second-public key, a second private-key, a first secret-key, a second secret-key, a copyright management program, and copyright information are stored in said electrically erasable programmable read-only memory.

2. The data copyright management apparatus according to claim 1, which is configured in the form of an IC.

3. The data copyright management apparatus according to claim 1, which is configured in the form of an IC card.

4. The data copyright management apparatus according to claim 1, which is configured in the form of a PC card.

5. The data copyright management apparatus according to claim 1, which is configured in the form of an insertion board.

* * * * *